(12) United States Patent
Yamazaki et al.

(10) Patent No.: US 11,778,342 B2
(45) Date of Patent: Oct. 3, 2023

(54) SOLID-STATE IMAGE PICKUP ELEMENT, IMAGE PICKUP APPARATUS, AND METHOD OF CONTROLLING SOLID-STATE IMAGE PICKUP ELEMENT

(71) Applicant: Sony Semiconductor Solutions Corporation, Kanagawa (JP)

(72) Inventors: Tomohiro Yamazaki, Kanagawa (JP); Yoshinori Muramatsu, Kanagawa (JP); Shigetaka Kudo, Kanagawa (JP); Kazuhiko Muraoka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/635,872

(22) PCT Filed: Jun. 9, 2020

(86) PCT No.: PCT/JP2020/022638
§ 371 (c)(1),
(2) Date: Feb. 16, 2022

(87) PCT Pub. No.: WO2021/039017
PCT Pub. Date: Mar. 4, 2021

(65) Prior Publication Data
US 2022/0295000 A1   Sep. 15, 2022

(30) Foreign Application Priority Data

Aug. 23, 2019 (JP) ................................ 2019-152770

(51) Int. Cl.
*H04N 25/53* (2023.01)
*H04N 25/75* (2023.01)
*H04N 25/79* (2023.01)

(52) U.S. Cl.
CPC ............ *H04N 25/53* (2023.01); *H04N 25/75* (2023.01); *H04N 25/79* (2023.01)

(58) Field of Classification Search
None
See application file for complete search history.

(56) References Cited

U.S. PATENT DOCUMENTS

2012/0281126 A1   11/2012   Fossum
2017/0214867 A1*   7/2017   Ishii .................. H04N 25/76

FOREIGN PATENT DOCUMENTS

EP        3032822 A1    6/2016
WO    2018/096813 A1    5/2018

OTHER PUBLICATIONS

International Search Report (PCT/ISA/210), International Application No. PCT/JP2020/022638, dated Aug. 10, 2020.

(Continued)

*Primary Examiner* — Mark T Monk
(74) *Attorney, Agent, or Firm* — Michael Best & Friedrich LLP

(57) ABSTRACT

Image quality is to be improved in a solid-state image pickup element that performs time delay integration.
A correlated double sampling circuit generates a frame in which a predetermined number of lines each including a plurality of digital signals are arranged. A TDI frame memory retains a (K−1)-th frame generated before a K-th frame. A time delay integration circuit performs time delay integration processing of adding the line having a predetermined address in the K-th frame and the line having an address at a certain distance from the predetermined address in the (K−1)-th frame.

16 Claims, 33 Drawing Sheets

(56) References Cited

OTHER PUBLICATIONS

Hyun Jung Lee et al., "Charge-Coupled CMOS TDI Imager", [online], [Searched on Jul. 22, 2019],Internet <URL:http://www.imagesensors.org/Past%20Workshops/2017%20Workshop/2017%20Papers/P16.pdf>.

* cited by examiner

SOLID-STATE IMAGE PICKUP ELEMENT, IMAGE PICKUP APPARATUS, AND METHOD OF CONTROLLING SOLID-STATE IMAGE PICKUP ELEMENT

CROSS REFERENCE TO RELATED APPLICATIONS

This application claims the benefit of Japanese Priority Patent Application JP 2019-152770 filed on Aug. 23, 2019, the entire contents of which are incorporated herein by reference.

TECHNICAL FIELD

The present technology relates to a solid-state image pickup element. Particularly, the present technology relates to a solid-state image pickup element that performs analog-to-digital conversion every pixel, an image pickup apparatus, and a method of controlling the solid-state image pickup element.

BACKGROUND ART

Until now, a time delay integration (TDI) sensor has been used in the field of factory automation (FA) or aerial capturing. The TDI sensor performs TDI processing of integrating the amount of electric charge with shifting in time corresponding to the speed of movement of a subject. For example, a solid-state image pickup element has been proposed that performs TDI processing with a charge coupled device (CCD) that transfers electric charge with shifting in time and a circuit that accumulates the amount of electric charge thereof in a floating diffusion layer to generate an integral signal (for example, refer to NPL 1).

CITATION LIST

Non Patent Literature

[NPL 1]
Hyun Jung Lee et al., "Charge-Coupled CMOS TDI Imager", [online], [Searched on Jul. 22, 2019], Internet <URL:http://www.imagesensors.org/Past %20Workshops/2017%20 Workshop/2017%20Papers/P16.pdf>

SUMMARY

Technical Problem

In the related art, improvement in brightness and noise reduction are carried out by the TDI processing. However, in the above solid-state image pickup element, as the number of pixels increases at the source from which electric charge is transferred, the capacity of the floating diffusion layer needs increasing at the destination to which electric charge is transferred. The increase of the capacity causes deterioration in pixel sensitivity, and then the image quality of image data deteriorates due to the deterioration in pixel sensitivity. As above, the solid-state image pickup element has a problem with deterioration in image quality due to deterioration in sensitivity.

The present technology has been made in consideration of such a situation. There is a need for improvement in image quality in a solid-state image pickup element that performs time delay integration.

Solution to Problem

The present technology has been made in order to solve the problem. According to a first aspect of the present technology, there is provided an imaging device comprising: a first substrate including a plurality of pixels arranged in a matrix, a respective pixel of the plurality of pixels configured to output a pixel signal; and a second substrate stacked with the first substrate, the second substrate including: at least a portion of analog to digital circuitry configured to output a digital signal based on the pixel signal, arithmetic circuitry configured to receive the digital signal, first memory circuitry coupled to the arithmetic circuitry, second memory circuitry coupled to the arithmetic circuitry, and image processing circuitry coupled to the second memory circuitry.

According to a second aspect of the present technology, there is provided a method in an imaging device, the method comprising: outputting a pixel signal from a respective pixel of a plurality of pixels that are arranged in a matrix; outputting a digital signal from analog to digital circuitry, the digital signal being based on the pixel signal; and receiving the digital signal by arithmetic circuitry, wherein the imaging device comprises a first substrate including the plurality of pixels, and a second substrate stacked with the first substrate and including at least a portion of the analog to digital circuitry, the arithmetic circuitry, first memory circuitry, second memory circuitry, and image processing circuitry.

According to a third aspect of the present technology, there is provided an electronic apparatus comprising: an optical assembly configured to condense and guide incident light; and an imaging device configured to receive the incident light, the imaging device comprising: a first substrate including a plurality of pixels arranged in a matrix, a respective pixel of the plurality of pixels configured to output a pixel signal in response to the incident light, and a second substrate stacked with the first substrate, the second substrate including: at least a portion of analog to digital circuitry configured to output a digital signal based on the pixel signal, arithmetic circuitry configured to receive the digital signal, first memory circuitry coupled to the arithmetic circuitry, second memory circuitry coupled to the arithmetic circuitry, and image processing circuitry coupled to the second memory circuitry.

Furthermore, in the first, second, or third aspect, the arithmetic circuitry may include column CDS processing circuitry and column TDI arithmetic circuitry.

Furthermore, in the first, second, or third aspect, a frame of digital signal may include a first phase level and a second phase level, and the first memory circuitry may be configured to store the first phase level.

Furthermore, in the first, second, or third aspect, the arithmetic circuitry may be configured to acquire a difference between the second phase level and the first phase level, and to store the difference in the first memory circuitry.

Furthermore, in the first, second, or third aspect, the image processing circuitry may be configured to perform a predetermined first image processing on the difference. The first image processing may be at least one of an image recognition processing, a black-level correction processing, an image correction processing, or a demosaic processing.

Furthermore, in the first, second, or third aspect, the arithmetic circuitry may be configured to, after the image processing circuitry performs the predetermined image processing, acquire a sum of a predetermined first line of the frame and a second line of the frame adjacent to the first line of the frame, and store the sum in the second memory circuitry.

Furthermore, in the first, second, or third aspect, the image processing circuitry may be configured to perform a second image processing on the sum. The second substrate may include output circuitry configured to output a result of the second image processing.

Furthermore, in the first, second, or third aspect, the respective pixel may include a floating diffusion.

DESCRIPTION OF EMBODIMENTS

Modes for carrying out the present technology (hereinafter, referred to as embodiments) will be described below. The descriptions will be given in the following order.
1. First Embodiment (example in which TDI processing is performed after CDS processing)
2. Second Embodiment (example in which a CDS circuit and a TDI circuit are disposed differently in location and TDI processing is performed after CDS processing)

3. Third Embodiment (example in which a buffer is added and TDI processing is performed after CDS processing)
4. Fourth Embodiment (example in which a CDS circuit is shared between two columns and TDI processing is performed after CDS processing)
5. Fifth Embodiment (example in which a CDS circuit is shared between four columns and TDI processing is performed after CDS processing)

1. First Embodiment (Exemplary Configuration of Image Pickup Apparatus)

Figure 1:
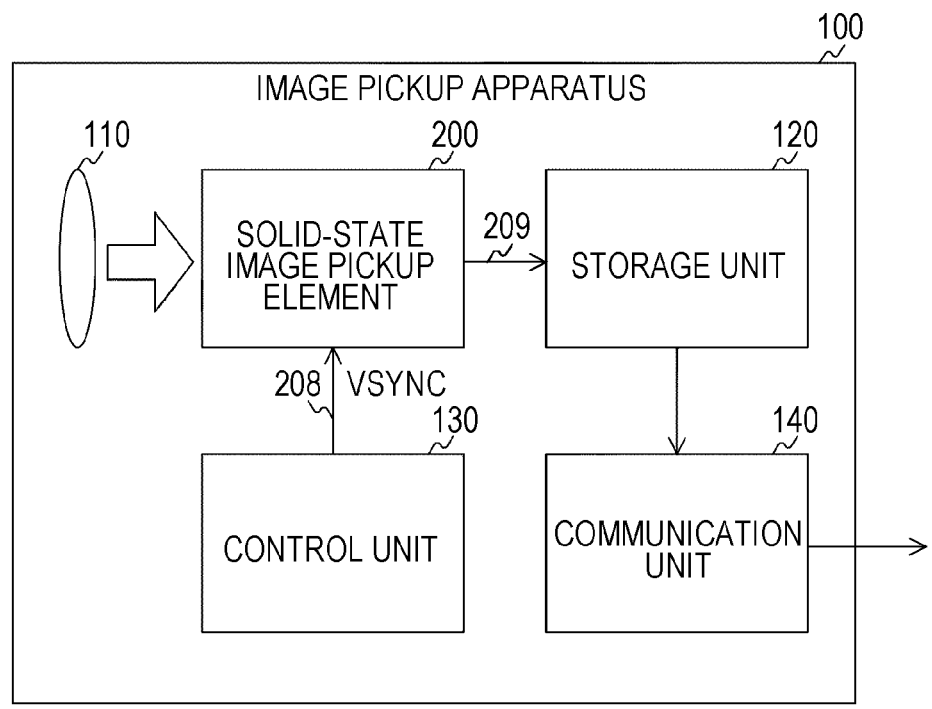
FIG. 1 is a block diagram of an exemplary configuration of an image pickup apparatus in a first embodiment of the present technology.

FIG. 1 is a block diagram of an exemplary configuration of an image pickup apparatus 100 in a first embodiment of the present technology. The image pickup apparatus 100 that captures image data, includes an optical unit 110, a solid-state image pickup element 200, a storage unit 120, a control unit 130, and a communication unit 140.

The optical unit 110 condenses incident light and guides the incident light to the solid-state image pickup element 200. The solid-state image pickup element 200 captures image data. The solid-state image pickup element 200 supplies the image data to the storage unit 120 through a signal line 209.

The storage unit 120 stores the image data. The control unit 130 controls the solid-state image pickup element 200 such that the solid-state image pickup element 200 captures the image data. For example, the control unit 130 supplies the solid-state image pickup element 200 with a vertical synchronizing signal VSYNC indicating capturing timing, through a signal line 208.

The communication unit 140 reads the image data from the storage unit 120 and transmits the image data outward.

Figure 2:
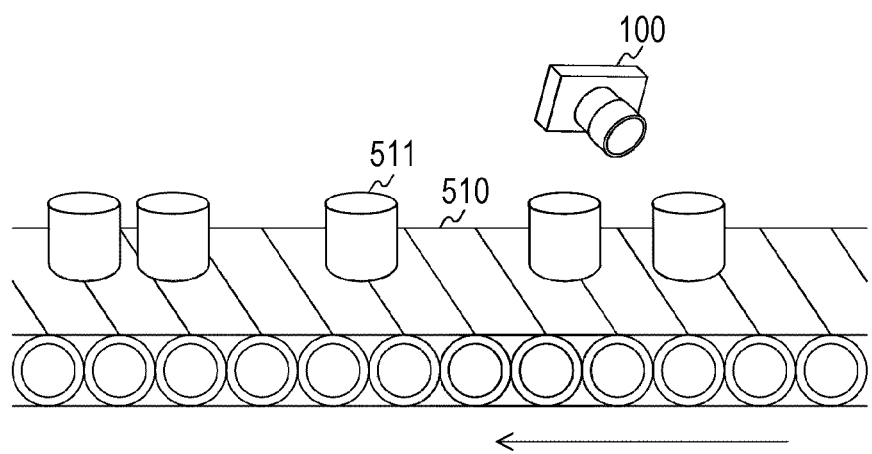
FIG. 2 explanatorily illustrates exemplary use of the image pickup apparatus in the first embodiment of the present technology.

FIG. 2 explanatorily illustrates exemplary use of the image pickup apparatus 100 in the first embodiment of the present technology. As exemplified in the figure, the image pickup apparatus 100 is used in, for example, a factory provided with a conveyor belt 510.

The conveyor belt 510 moves a subject 511 at a constant speed in a predetermined direction. The image pickup apparatus 100 secured near the conveyor belt 510, captures the subject 511 to generate image data. The image data is used in inspection of, for example, the presence or absence of defects or the like. Therefore, FA is achieved.

Note that the image pickup apparatus 100 captures the subject 511 moving at the constant speed, but the configuration is not limited thereto. Like aerial capturing, the image pickup apparatus 100 may capture a subject while moving to the subject at a constant speed.

(Exemplary Configuration of Solid-State Image Pickup Element)

Figure 3:
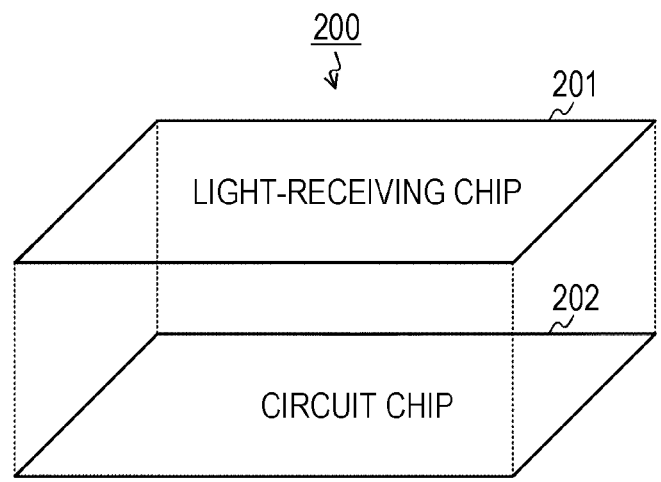
FIG. 3 illustrates an exemplary layered structure of a solid-state image pickup element in the first embodiment of the present technology.

FIG. 3 illustrates an exemplary layered structure of the solid-state image pickup element 200 in the first embodiment of the present technology. The solid-state image pickup element 200 includes a circuit chip 202 and a light-receiving chip 201 layered on the circuit chip 202. The chips are electrically connected through a connection, such as a via. Note that, instead of the via, a Cu—Cu junction or a bump enables electrical connection of the chips.

Figure 4:
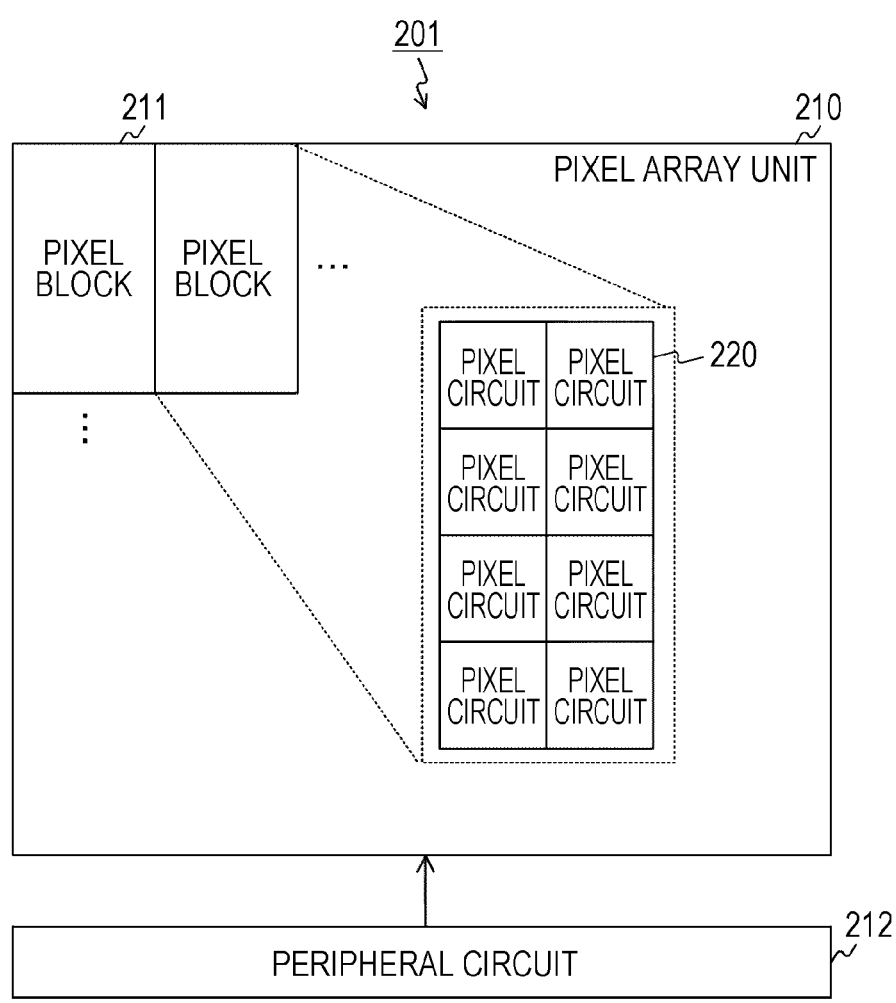
FIG. 4 is a block diagram of an exemplary configuration of a light-receiving chip in the first embodiment of the present technology.

FIG. 4 is a block diagram of an exemplary configuration of the light-receiving chip 201 in the first embodiment of the present technology. The light-receiving chip 201 is provided with a pixel array unit 210 and a peripheral circuit 212.

The pixel array unit 210 includes a plurality of pixel circuits 220 arranged in a two-dimensional grid pattern. Furthermore, the pixel array unit 210 is divided into a plurality of pixel blocks 211. The pixel blocks 211 each include, for example, pixel circuits 220 arranged in a matrix of 4 rows by 2 columns.

For example, a circuit that supplies direct current (DC) voltage and the like are disposed in the peripheral circuit 212.

Figure 5:
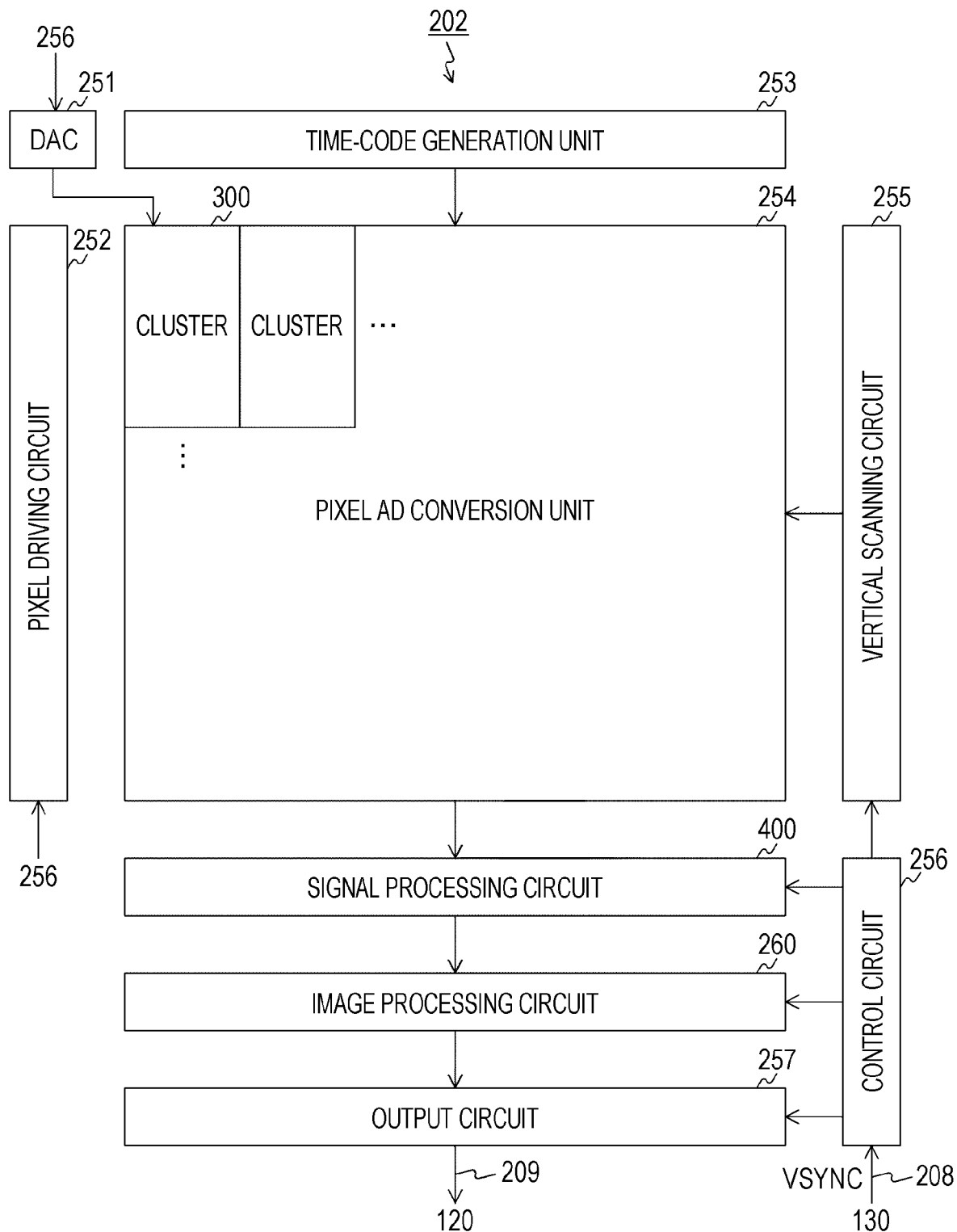
FIG. 5 is a block diagram of an exemplary configuration of a circuit chip in the first embodiment of the present technology.

FIG. 5 is a block diagram of an exemplary configuration of the circuit chip 202 in the first embodiment of the present technology. A digital-to-analog converter (DAC) 251, a pixel driving circuit 252, a time-code generation unit 253, a pixel AD conversion unit 254, and a vertical scanning circuit 255 are disposed on the circuit chip 202. A control circuit 256, a signal processing circuit 400, an image processing circuit 260, and an output circuit 257 are further disposed on the circuit chip 202.

The DAC 251 generates a reference signal with digital-to-analog (DA) conversion during a predetermined AD conversion period. For example, a sawtooth ramp signal is used as the reference signal. The DAC 251 supplies the reference signal to the pixel AD conversion unit 254.

The time-code generation unit 253 generates a time code indicating time in the AD conversion period. The time-code generation unit 253 is achieved by, for example, a counter. For example, a gray code counter is used as the counter. The time-code generation unit 253 supplies the time code to the pixel AD conversion unit 254.

The pixel driving circuit 252 drives each pixel circuit 220 such that each pixel circuit 220 generates an analog pixel signal.

The pixel AD conversion unit 254 performs AD conversion in which the analog signal of each pixel circuit 220 (namely, the pixel signal) is converted into a digital signal. The pixel AD conversion unit 254 is divided into a plurality of clusters 300. The clusters 300 are provided one-to-one to the pixel blocks 211. The clusters 300 each convert the analog signals in the corresponding pixel block 211, into digital signals.

The pixel AD conversion unit 254 generates image data in which the digital signals are arranged, as a frame with the AD conversion, and supplies the image data to the signal processing circuit 400. Hereinafter, each group of digital signals arranged in the horizontal direction in the frame is referred to as a "line". A row address indicating the location of the line in the vertical direction is allocated to each line.

The vertical scanning circuit 255 drives the pixel AD conversion unit 254 such that the pixel AD conversion unit 254 performs the AD conversion.

The signal processing circuit 400 performs predetermined signal processing to the frame. As the signal processing, various types of processing including CDS processing and TDI processing are performed. The signal processing circuit 400 supplies the image processing circuit 260 with the frame after the processing.

The image processing circuit 260 performs predetermined image processing to the frame from the signal processing circuit 400. As the image processing, image recognition processing, black-level correction processing, image correction processing, demosaic processing, or the like is performed. The image processing circuit 260 supplies the output circuit 257 with the frame after the processing.

The output circuit 257 outputs the frame after the image processing, outward.

The control circuit 256 controls the respective operation timings of the DAC 251, the pixel driving circuit 252, the vertical scanning circuit 255, the signal processing circuit 400, the image processing circuit 260, and the output circuit 257, in synchronization with the vertical synchronizing signal VSYNC.

(Exemplary Configuration of Pixel AD Conversion Unit)

Figure 6:
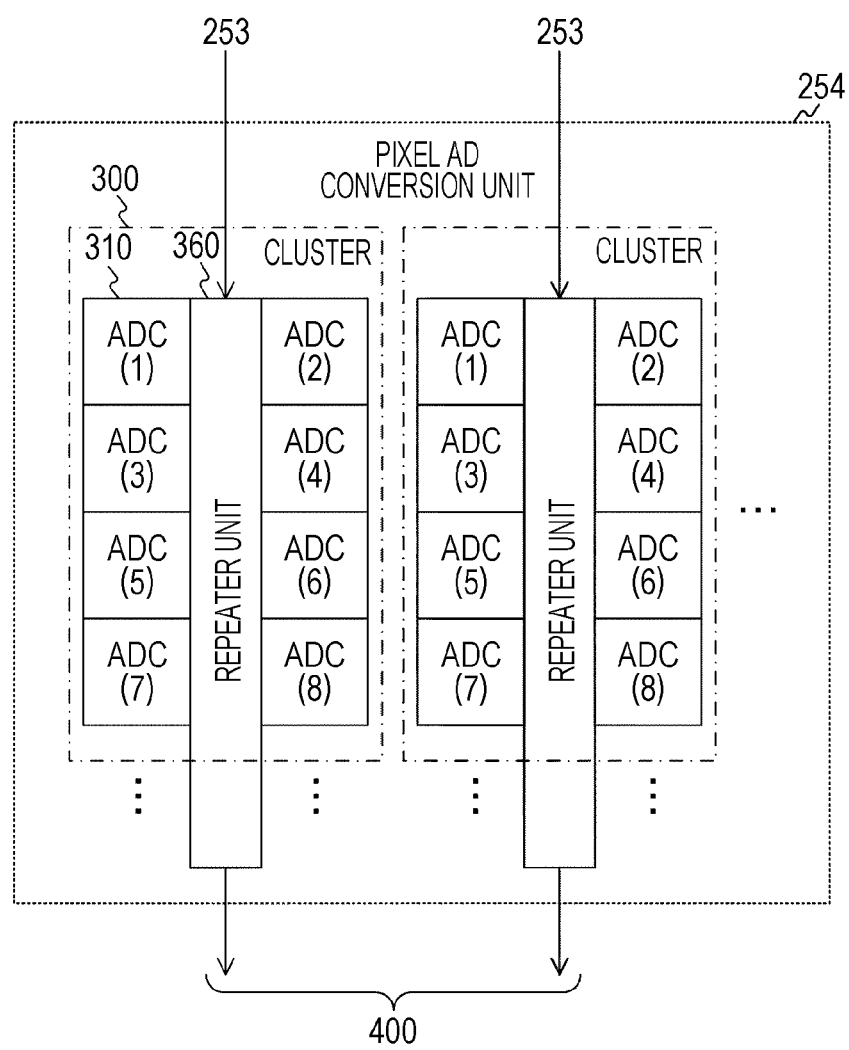
FIG. 6 illustrates an exemplary configuration of a pixel analog-to-digital (AD) conversion unit in the first embodiment of the present technology.

FIG. 6 illustrates an exemplary configuration of the pixel AD conversion unit 254 in the first embodiment of the present technology. The pixel AD conversion unit 254 includes a plurality of ADCs 310 arranged in a two-dimensional grid pattern. The ADCs 310 are disposed one-to-one to the pixel circuits 220. In a case where the number of rows and the number of columns of pixel circuits 220 are N (N is an integer) and M (M is an integer), respectively, N×M pieces of ACDs 310 are disposed.

The ADCs 310 identical in number to the pixel circuits 220 in the pixel block 211 are disposed in each cluster 300. In a case where pixel circuits 220 are arranged in a matrix of 4 rows by 2 columns in each pixel block 211, ADCs 310 are arranged in a matrix of 4 rows by 2 columns in each cluster 300.

The ADCs 310 each perform the AD conversion to the analog pixel signal generated by the corresponding pixel circuit 220. In the AD conversion, each ADC 310 compares the pixel signal and the reference signal, and retains the time code when a result of the comparison is inverted. Then, each ADC 310 outputs the retained time code as the digital signal after the AD conversion.

Furthermore, a repeater unit 360 is disposed every column of clusters 300. In a case where the number of columns of clusters 300 is M/2, M/2 pieces of repeater units 360 are disposed. The repeater units 360 each transfer the time code. The repeater units 360 each transfer the time code from the time-code generation unit 253 to the ADCs 310. Furthermore, the repeater units 360 each transfer the digital signal from each ADC 310 to the signal processing circuit 400. The transfer of the digital signal is also called the "reading" of the digital signal.

Furthermore, in the figure, the number in each pair of parentheses indicates an exemplary order of reading of the digital signal of the ADC 310. For example, the digital signals at the odd columns in the first row are read first, and the digital signals at the even columns in the first row are read second. The digital signals at the odd columns in the second row are read third, and the digital signals at the even columns in the second row are read fourth. After that, similarly, the digital signals at the odd columns and the digital signals at the even columns in each row are read sequentially.

Note that the ADCs 310 are disposed one-to-one to the pixel circuits 220, but the configuration is not limited thereto. A plurality of pixel circuits 220 may share one ADC 310.

(Exemplary Configuration of ADC)

Figure 7:
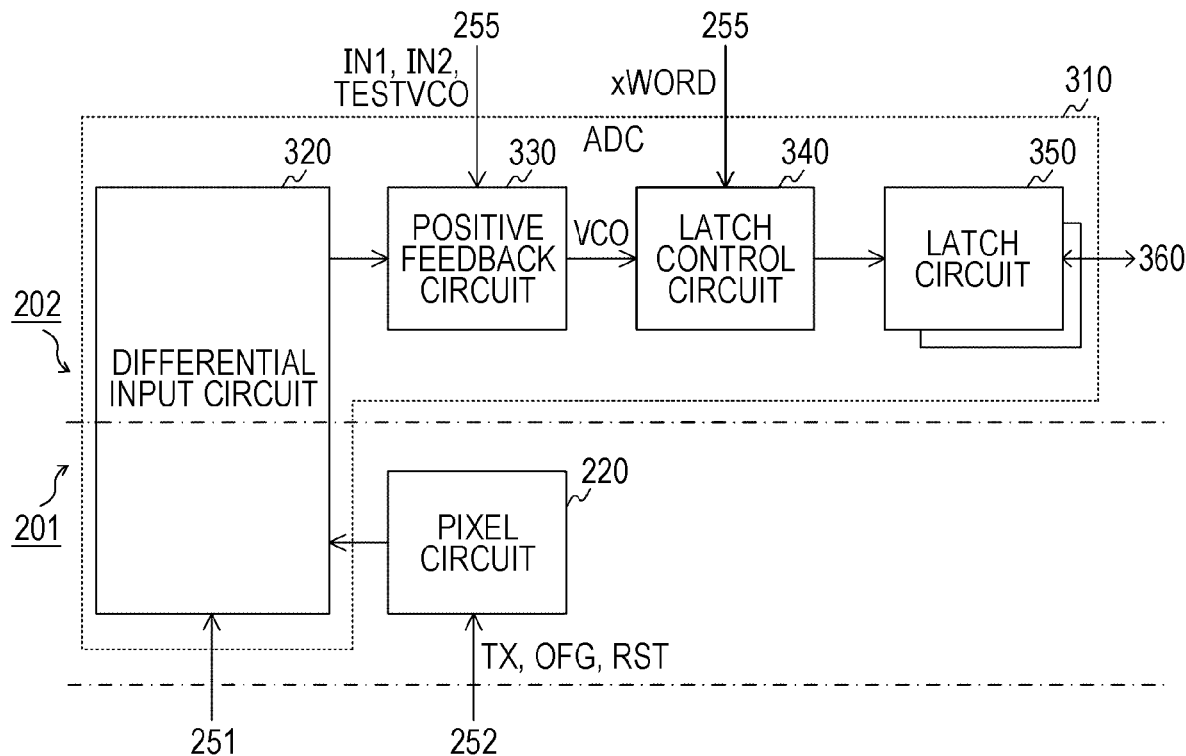
FIG. 7 is a block diagram of an exemplary configuration of an analog-to-digital converter (ADC) in the first embodiment of the present technology.

FIG. 7 is a block diagram of an exemplary configuration of the ADC 310 in the first embodiment of the present technology. The ADC 310 includes a differential input circuit 320, a positive feedback circuit 330, a latch control circuit 340, and a plurality of latch circuits 350.

Furthermore, the pixel circuit 220 and part of the differential input circuit 320 are disposed on the light-receiving chip 201. The remaining part of the differential input circuit 320 and the circuits at the post-stage thereof are disposed on the circuit chip 202.

The differential input circuit 320 compares the pixel signal from the pixel circuit 220 and the reference signal from the DAC 251. The differential input circuit 320 supplies the positive feedback circuit 330 with a comparative-result signal indicating a result of the comparison.

The positive feedback circuit 330 adds a partial output to the input (comparative-result signal) and supplies the latch control circuit 340 with the input having the partial output added thereto as an output signal VCO.

In accordance with a control signal xWORD from the vertical scanning circuit 255, the latch control circuit 340 causes the plurality of latch circuits 350 to retain the time code at the time when the output signal VCO is inverted.

In accordance with the control of the latch control circuit 340, the latch circuits 350 retain the time code from the repeater unit 360. The latch circuits 350 are provided for the bit length of the time code. For example, in a case where the time code is 15 bits, 15 pieces of latch circuits 350 are disposed in the ADC 310. Furthermore, the retained time code is read as the digital signal after the AD conversion by the repeater unit 360.

The configuration exemplified in the figure allows the ADC 310 to convert the pixel signal from the pixel circuit 220, into the digital signal.

(Exemplary Configurations of Pixel Circuit, Differential Input Circuit, and Positive Feedback Circuit)

Figure 8:
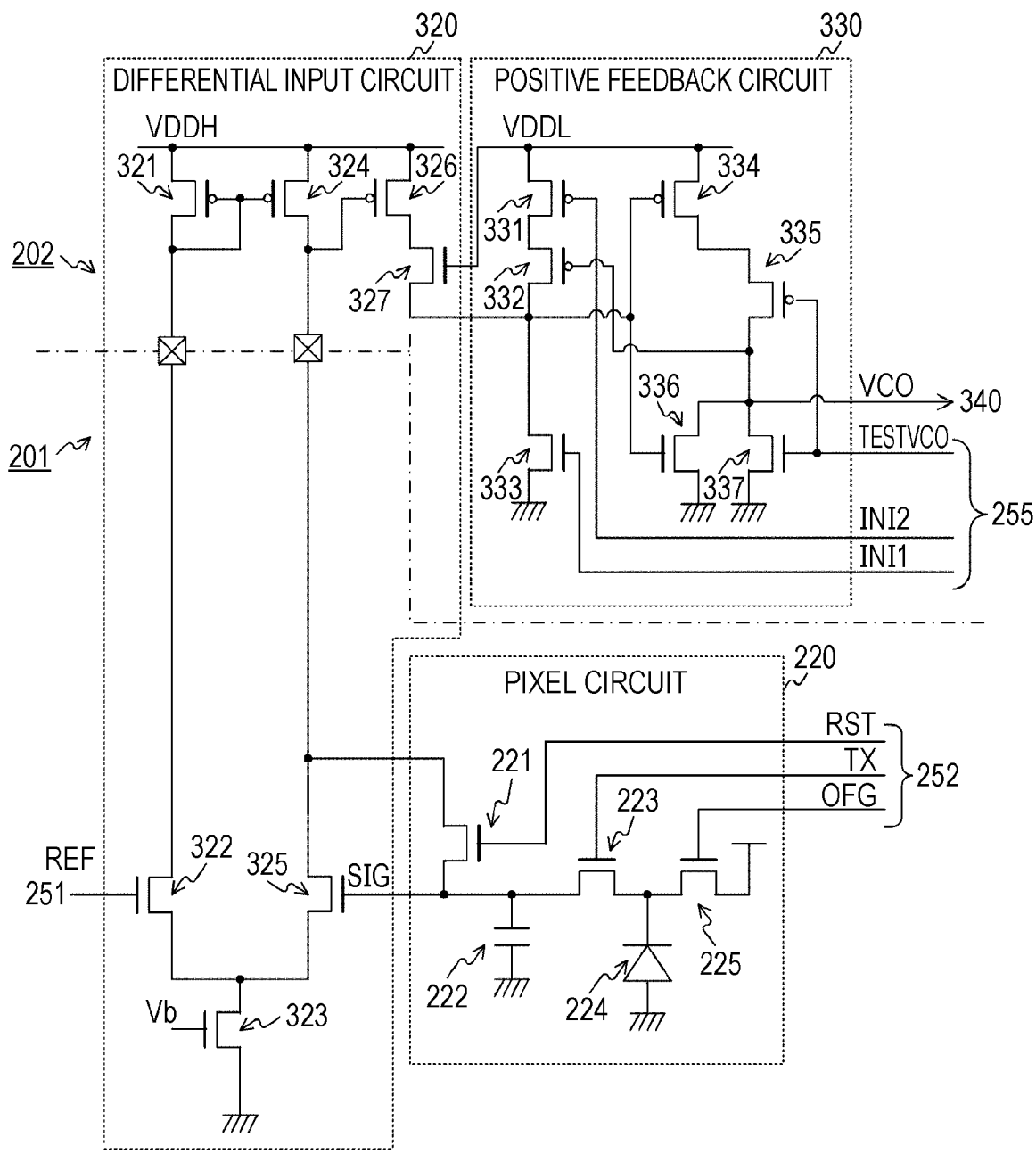
FIG. 8 is a circuit diagram of exemplary configurations of a pixel circuit, a differential input circuit, and a positive feedback circuit in the first embodiment of the present technology.

FIG. 8 is a circuit diagram of exemplary configurations of the pixel circuit 220, the differential input circuit 320, and the positive feedback circuit 330 in the first embodiment of the present technology.

The pixel circuit 220 includes a reset transistor 221, a floating diffusion layer 222, a transfer transistor 223, a photodiode 224, and a discharge transistor 225. As the reset transistor 221, the transfer transistor 223, and the discharge transistor 225, for example, an n-channel metal oxide semiconductor (nMOS) transistor is used.

The photodiode 224 photoelectrically generates electric charge. The discharge transistor 225 discharges the electric charge accumulated in the photodiode 224, in accordance with a driving signal OFG from the pixel driving circuit 252.

The transfer transistor 223 transfers the electric charge from the photodiode 224 to the floating diffusion layer 222, in accordance with a transfer signal TX from the pixel driving circuit 252.

The floating diffusion layer 222 accumulates the transferred electric charge, and generates voltage corresponding to the amount of electric charge.

The reset transistor 221 initializes the floating diffusion layer 222, in accordance with a reset signal RST from the pixel driving circuit 252.

The differential input circuit 320 includes p-channel metal oxide semiconductor (pMOS) transistors 321, 324, and 326 and nMOS transistors 322, 323, 325, and 327.

Among the above transistors, the nMOS transistors 322, 323, and 325 are disposed on the light-receiving chip 201, and the remaining transistors are disposed on the circuit chip 202.

The nMOS transistors 322 and 325 form a differential pair, and the respective sources of the transistors are connected in common with the drain of the nMOS transistor 323. Furthermore, the drain of the nMOS transistor 322 is connected with the drain of the pMOS transistor 321 and the respective gates of the pMOS transistors 321 and 324. The drain of the nMOS transistor 325 is connected with the drain of the pMOS transistor 324, the gate of the pMOS transistor 326, and the drain of the reset transistor 221. Furthermore, the reference signal REF from the DAC 251 is input into the gate of the nMOS transistor 322.

Predetermined bias voltage Vb is applied to the gate of the nMOS transistor 323, and predetermined ground voltage is applied to the source of the nMOS transistor 323.

The pMOS transistors 321, 324, and 326 form a current mirror circuit. Power source voltage VDDH is applied to the respective sources of the pMOS transistors 321, 324, and 326. The power source voltage VDDH is higher than power source voltage VDDL to be described below.

The power source voltage VDDL is applied to the gate of the nMOS transistor 327. Furthermore, the drain of the nMOS transistor 327 is connected with the drain of the pMOS transistor 326, and the source of the nMOS transistor 327 is connected with the positive feedback circuit 330.

The positive feedback circuit 330 includes pMOS transistors 331, 332, 334, and 335 and nMOS transistors 333, 336, and 337. The pMOS transistors 331 and 332 and the nMOS transistor 333 are connected in series to the power source voltage VDDL. Furthermore, a driving signal INI2 from the vertical scanning circuit 255 is input into the gate of the pMOS transistor 331. The node between the pMOS transistor 332 and the nMOS transistor 333 is connected with the source of the nMOS transistor 327.

The ground voltage is applied to the source of the nMOS transistor 333, and a driving signal INI1 from the vertical scanning circuit 255 is input into the gate of the nMOS transistor 333.

The pMOS transistors 334 and 335 are connected in series to the power source voltage VDDL. Furthermore, the drain of the pMOS transistor 335 is connected with the gate of the pMOS transistor 332 and the respective drains of the nMOS transistors 336 and 337. A control signal TESTVCO from the vertical scanning circuit 255 is input into the respective gates of the pMOS transistor 335 and the nMOS transistor 337. Furthermore, the respective gates of the pMOS transistor 334 and the nMOS transistor 336 are connected with the node between the pMOS transistor 332 and the nMOS transistor 333.

The output signal VCO is output from the node between the pMOS transistor 335 and the nMOS transistor 337. Furthermore, the ground voltage is applied to the respective sources of the nMOS transistors 336 and 337.

Note that, as long as having the respective functions described in FIG. 7, the pixel circuit 220, the differential input circuit 320, and the positive feedback circuit 330 are not limited to the respective circuits exemplified in FIG. 8.

(Exemplary Configuration of Signal Processing Circuit)

Figure 9:
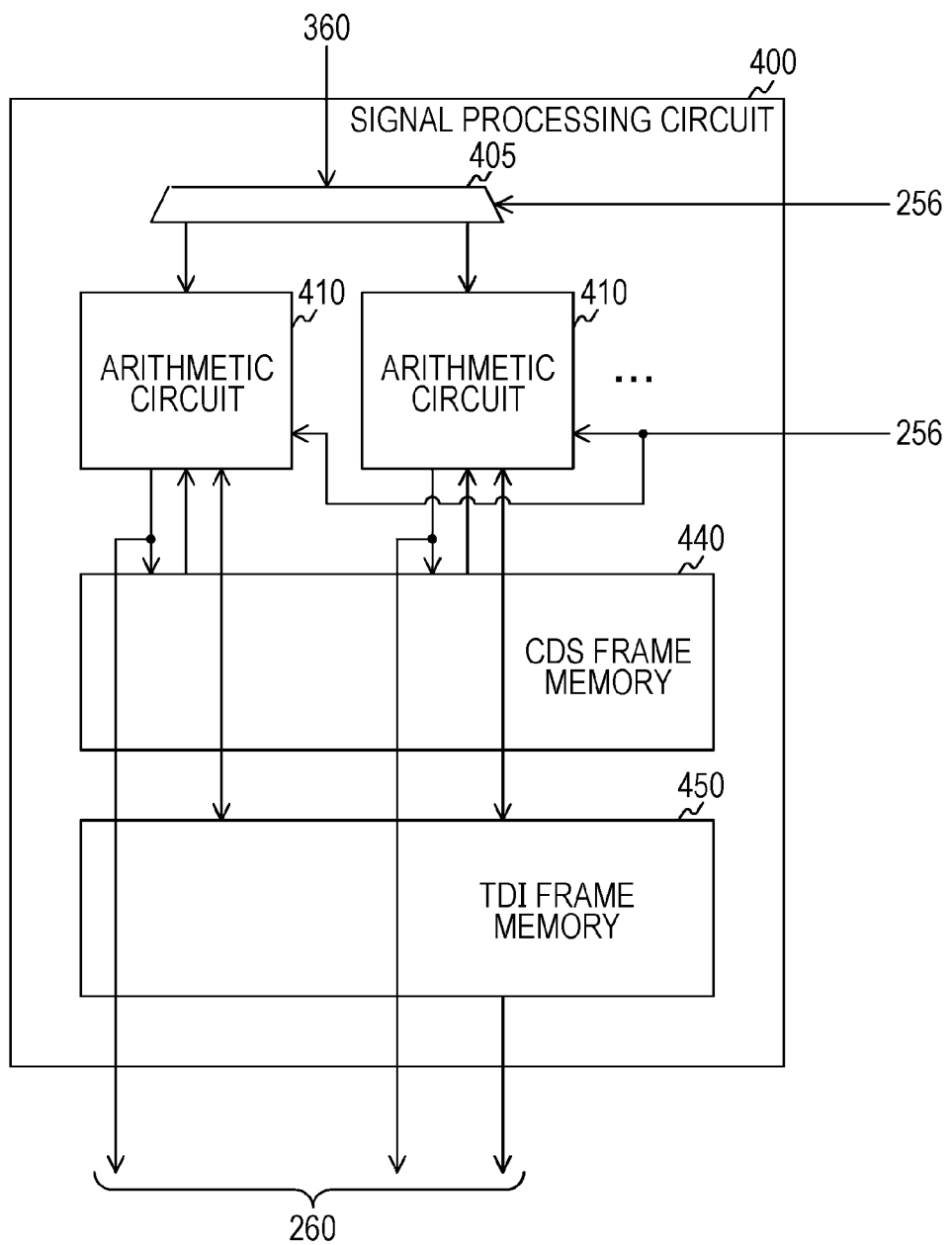
FIG. 9 is a block diagram of an exemplary configuration of a signal processing circuit in the first embodiment of the present technology.

FIG. 9 is a block diagram of an exemplary configuration of the signal processing circuit 400 in the first embodiment of the present technology. The signal processing circuit 400 includes a plurality of selectors 405, a plurality of arithmetic circuits 410, a CDS frame memory 440, and a TDI frame memory 450.

The selectors 405 are disposed one-to-one to the columns of clusters 300, namely, one-to-one to the repeater units 360. In a case where two columns of ADCs 310 are arranged in each cluster 300, a selector 405 is disposed every two columns. Furthermore, the arithmetic circuits 410 are disposed one-to-one to the columns of ADCs 310. In a case where M columns of ADCs 310 are provided, M/2 pieces of selectors 405 and M pieces of arithmetic circuits 410 are disposed.

As described above, each repeater unit 360 sequentially outputs the digital signals in the odd column and the digital signals in the even column.

The selector 405 selects an output destination for each digital signal, in accordance with the control of the control circuit 256. In a case where each repeater unit 360 outputs a digital signal in the odd column, the selector 405 outputs the digital signal to the arithmetic circuit 410 corresponding to the odd column. Meanwhile, in a case where each repeater unit 360 outputs a digital signal in the even column, the selector 405 outputs the digital signal to the arithmetic circuit 410 corresponding to the even column.

Each arithmetic circuit 410 performs the CDS processing and the TDI processing to the digital signal from the selector 405.

Here, the digital signal includes a P-phase level and a D-phase level. The P-phase level indicates the level at the time when the pixel circuit 220 is initialized due to the reset signal RST. Meanwhile, the D-phase level indicates the level corresponding to the amount of exposure at the time when the electric charge is transferred due to the transfer signal TX. The P-phase level is also called a reset level, and the D-phase level is also a signal level.

In the CDS processing, the M pieces of arithmetic circuits 410 retain a P-phase frame in which P-phase levels are arranged, into the CDS frame memory 440. Then, the M pieces of arithmetic circuits 410 acquire the difference between the P-phase level and the D-phase level every pixel, resulting in generation of a CDS frame in which difference data is arranged.

Then, in the TDI processing, the M pieces of arithmetic circuits 410 retain the first CDS frame into the TDI frame memory 450. Next, the M pieces of arithmetic circuits 410 add the line having a predetermined address in the CDS frame of the second frame after the CDS processing and the line having the address at a certain distance from the predetermined address in the frame of the first frame. As the speed of movement of the subject increases, the value to be set to the distance between the addresses for addition, increases. For example, "1" is set to the distance between the addresses for addition. In this case, adjacent lines are added together. For the second and subsequent frames, to the K-th CDS frame (K is an integer), the (K−1)-th CDS frame generated before the frame is retained in the TDI frame memory 450.

Furthermore, the M pieces of arithmetic circuits 410 supply the image processing circuit 260 with the CDS frame and a TDI frame after the TDI processing.

(Exemplary Configuration of Arithmetic Circuit)

Figure 10:
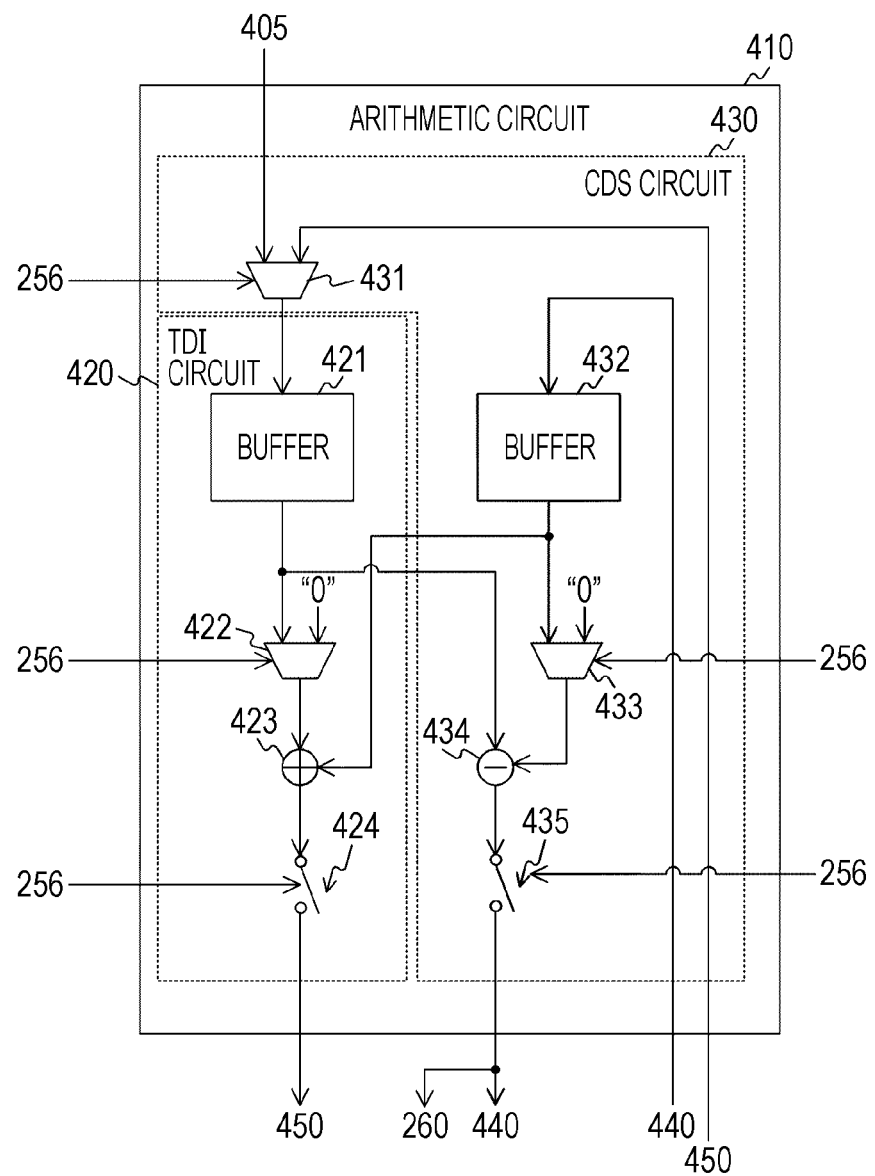
FIG. 10 is a circuit diagram of an exemplary configuration of an arithmetic circuit in the first embodiment of the present technology.

FIG. 10 is a circuit diagram of an exemplary configuration of the arithmetic circuit 410 in the first embodiment of the present technology. The arithmetic circuit 410 includes a TDI circuit 420 and a CDS circuit 430. The TDI circuit 420 includes a buffer 421, a selector 422, an adder 423, and a switch 424. The CDS circuit 430 includes a selector 431, a buffer 432, a selector 433, a subtractor 434, and a switch 435. For example, the respective operations of the selectors 422, 431, and 433 and the switches 424 and 435 are controlled by the control circuit 256.

The selector 431 selectively outputs either the digital signal from the selector 405 or the digital signal from the TDI frame memory 450, to the buffer 421.

The buffer 421 delay-outputs the signal from the selector 431. Note that the buffer 421 is an exemplary second buffer in the claims.

The selector 422 selectively outputs either the digital signal from the buffer 421 or a digital signal with the value "0" in decimal number, to the adder 423.

The adder 423 adds the digital signal from the selector 422 and the digital signal from the buffer 432. The adder 423 supplies the switch 424 with a digital signal indicating the addition in value as summation data.

The switch 424 opens and closes the path between the adder 423 and the TDI frame memory 450.

The buffer 432 delay-outputs the signal from the CDS frame memory 440. Note that the buffer 432 is an exemplary first buffer in the claims.

The selector 433 selectively outputs either the digital signal from the buffer 432 or a digital signal with the value "0" in decimal number, to the subtractor 434.

The subtractor 434 computes the difference between the digital signal from the buffer 421 and the digital signal from the selector 433. The subtractor 434 supplies the switch 435 with a digital signal indicating the difference as difference data.

The switch 435 opens and closes the path between the subtractor 434 and the CDS frame memory 440.

Next, a method of controlling the circuits in the arithmetic circuit 410 will be described.

(Exemplary Operation of Arithmetic Circuit)

Figure 11:
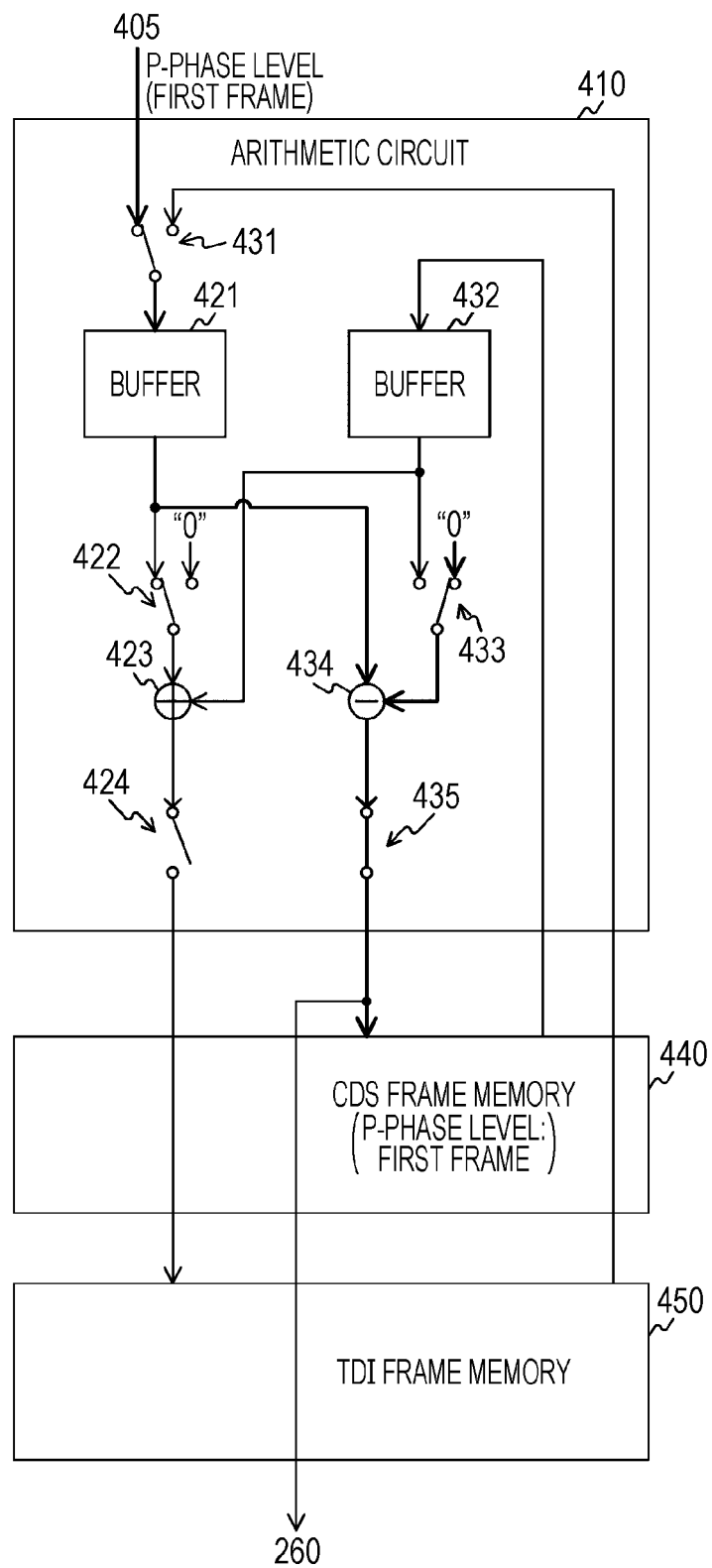
FIG. 11 illustrates an exemplary state of the arithmetic circuit at the time of retention of the P-phase level of the first frame in the first embodiment of the present technology.

FIG. 11 illustrates an exemplary state of the arithmetic circuit 410 at the time of retention of the P-phase level of the first frame in the first embodiment of the present technology.

The control circuit 256 initializes the CDS frame memory 440 and the TDI frame memory 450. After the initialization, the pixel AD conversion unit 254 generates the P-phase level of the first frame.

The plurality of P-phase levels in the corresponding column of the first frame is sequentially input into the selector 431. The selector 431 selectively outputs the P-phase levels to the buffer 421. The selector 433 outputs the digital signal "0" to the subtractor 434. The subtractor 434 subtracts "0" from the P-phase level, and outputs a result of the subtraction to the switch 435. Furthermore, the switch 424 is controlled in the open state, and the switch 435 is controlled in the closed state.

Due to the control, the M pieces of arithmetic circuits 410 retain the P-phase frame of the first frame in which the P-phase levels are arranged, into the CDS frame memory 440.

Figure 12:
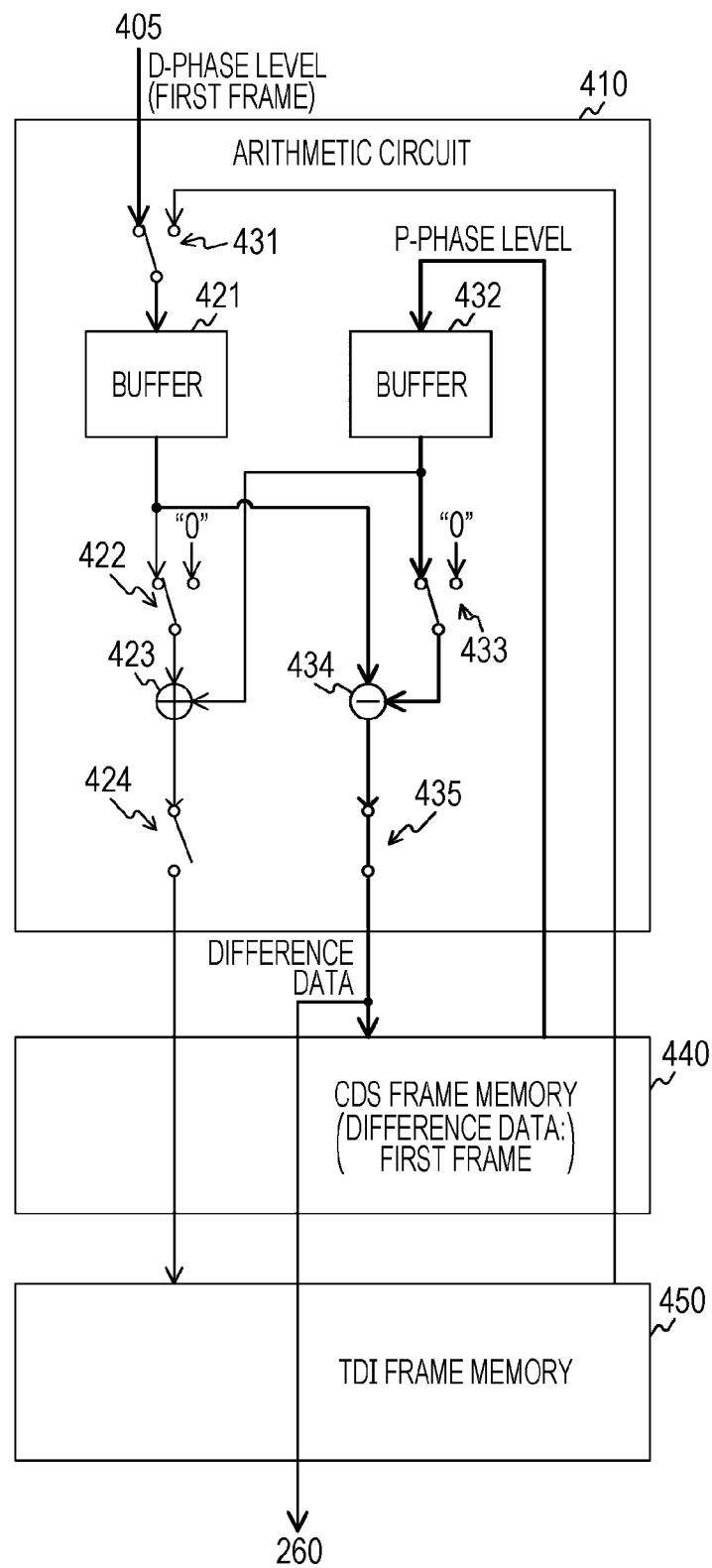
FIG. 12 illustrates an exemplary state of the arithmetic circuit at the time of performance of CDS processing to the first frame in the first embodiment of the present technology.

FIG. 12 illustrates an exemplary state of the arithmetic circuit at the time of performance of the CDS processing to the first frame in the first embodiment of the present technology.

The pixel AD conversion unit 254 generates the D-phase level of the first frame. The plurality of D-phase levels in the corresponding column of the first frame is sequentially input into the selector 431. The selector 431 selectively outputs the D-phase levels to the buffer 421.

Furthermore, the buffer 432 sequentially reads the plurality of P-phase levels in the corresponding column from the CDS frame memory 440, for output to the selector 433. The selector 433 selectively outputs the P-phase levels to the subtractor 434.

The subtractor 434 subtracts the P-phase level selected by the selector 433 from the D-phase level output from the buffer 421, and outputs a result of the subtraction as the difference data to the switch 435. Furthermore, the switch 424 is controlled in the open state, and the switch 435 is controlled in the closed state.

Due to the control, the M pieces of arithmetic circuits 410 perform the CDS processing to the first frame, and retain the CDS frame in which the difference data is arranged, in the CDS frame memory 440. Furthermore, the CDS frame is supplied also to the image processing circuit 260.

Figure 13:
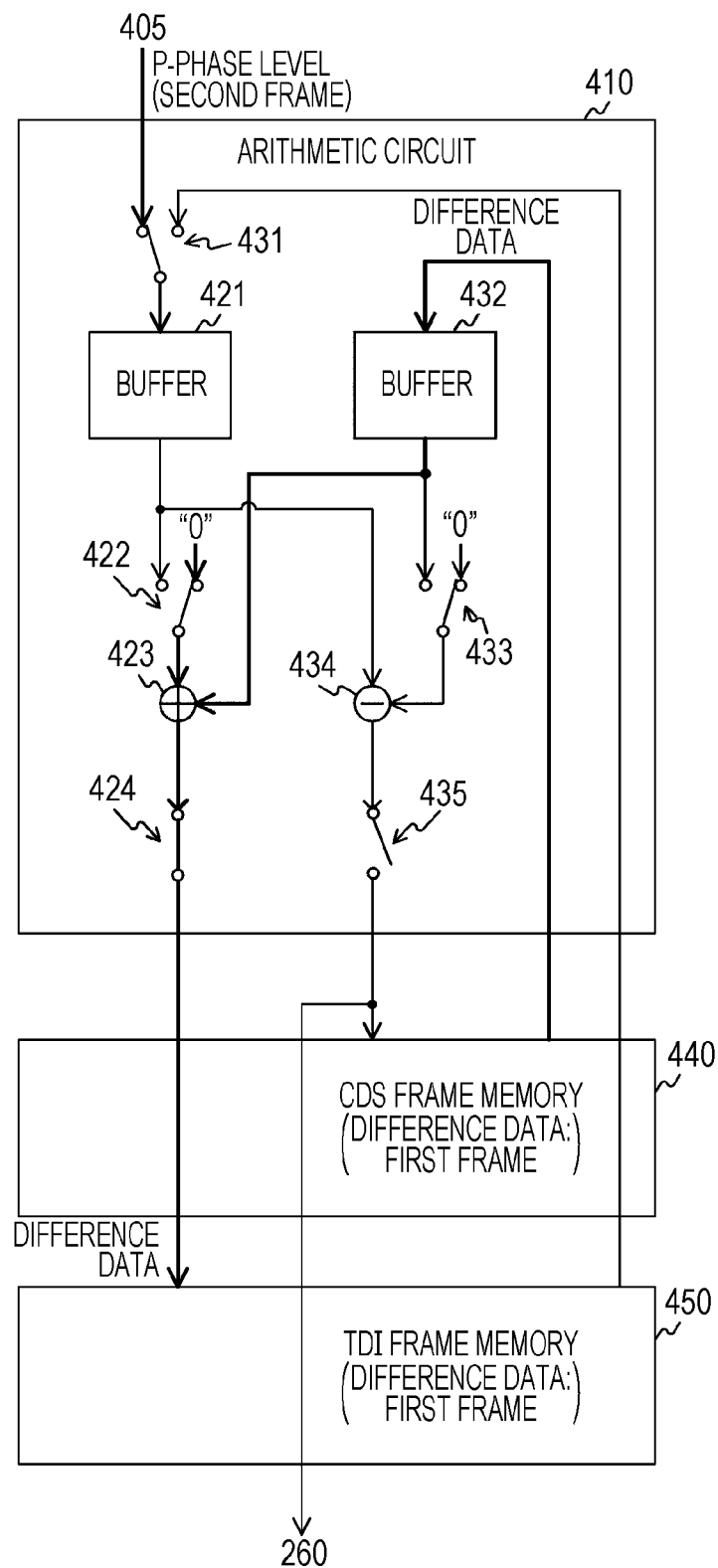
FIG. 13 illustrates an exemplary state of the arithmetic circuit at the time of retention of a frame in the first embodiment of the present technology.

FIG. 13 illustrates an exemplary state of the arithmetic circuit at the time of retention of a frame in the first embodiment of the present technology.

The pixel AD conversion unit 254 generates the P-phase level of the second frame. The plurality of P-phase levels in the corresponding column of the second frame is sequentially input into the selector 431. The selector 431 selectively outputs the P-phase levels to the buffer 421. The buffer 421 delays the P-phase levels.

The buffer 432 sequentially reads the plurality of pieces of difference data in the corresponding column from the CDS frame memory 440, for output to the adder 423. The selector 422 selectively outputs the digital signal "0" to the adder 423. The adder 423 adds "0" to the difference data, and outputs a result of the addition to the switch 424. Furthermore, the switch 424 is controlled in the closed state, and the switch 435 is controlled in the open state.

Due to the control, the M pieces of arithmetic circuits 410 retain the current CDS frame in which the different data is arranged, into the TDI frame memory 450.

Figure 14:
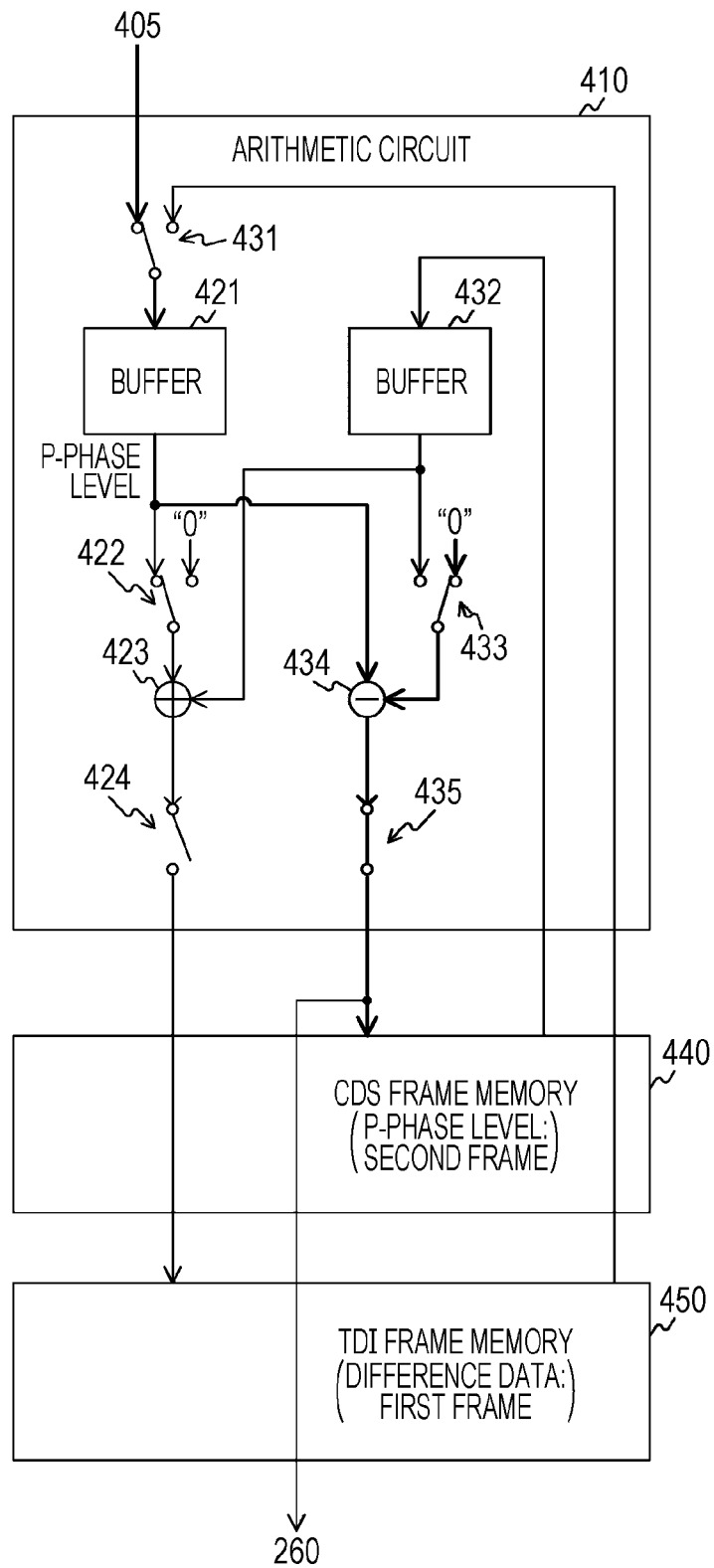
FIG. 14 illustrates an exemplary state of the arithmetic circuit at the time of retention of the P-phase level of the second frame in the first embodiment of the present technology.

FIG. 14 illustrates an exemplary state of the arithmetic circuit 410 at the time of retention of the P-phase level of the second frame in the first embodiment of the present technology.

The buffer 421 outputs the P-phase level to the subtractor 434. The selector 433 outputs the digital signal "0" to the subtractor 434. The subtractor 434 subtracts "0" from the P-phase level, and outputs a result of the subtraction to the switch 435.

Furthermore, the switch 424 is controlled in the open state, and the switch 435 is controlled in the closed state.

Due to the control, the M pieces of arithmetic circuits 410 retain the P-phase frame of the second frame in which the P-phase levels are arranged, in the CDS frame memory 440.

Figure 15:
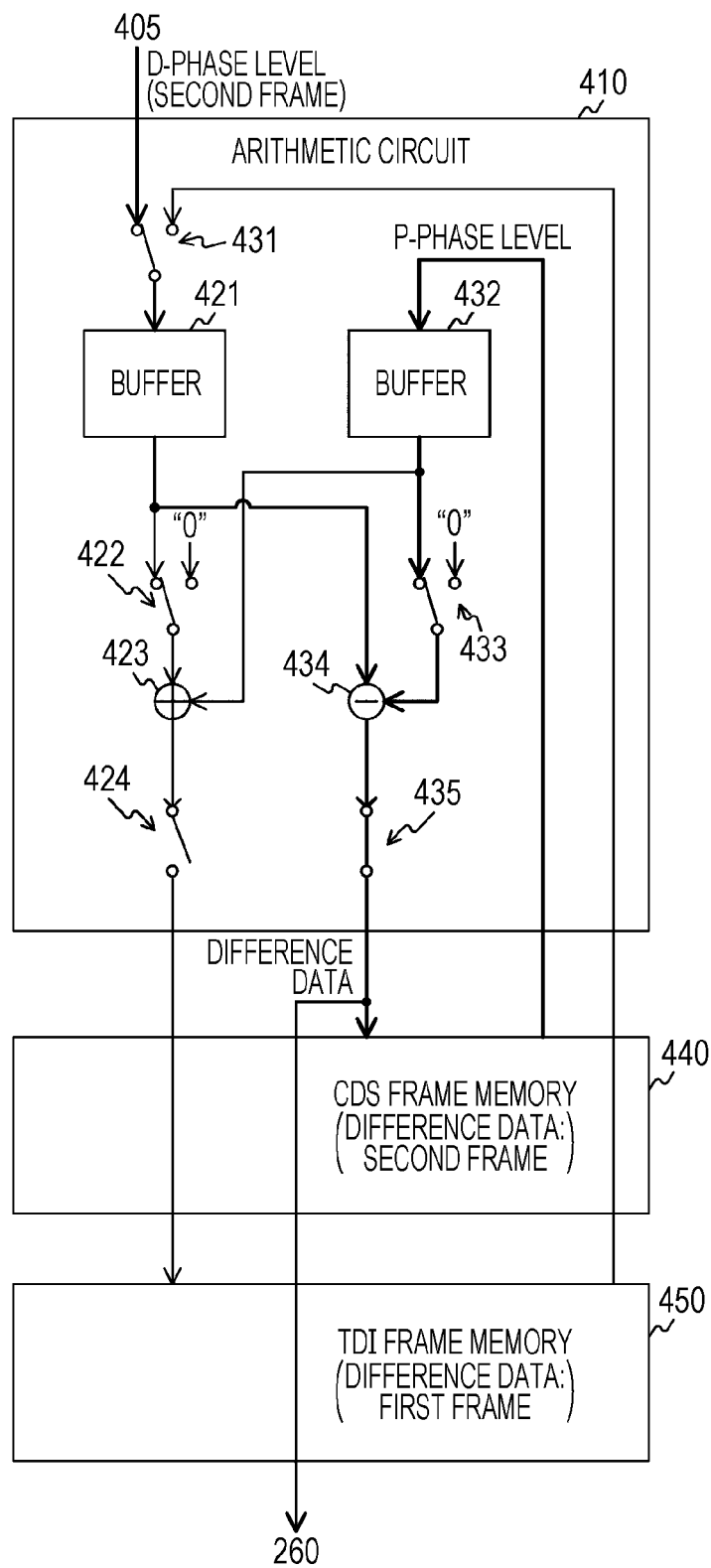
FIG. 15 illustrates an exemplary state of the arithmetic circuit at the time of performance of the CDS processing to the second frame in the first embodiment of the present technology.

FIG. 15 illustrates an exemplary state of the arithmetic circuit at the time of performance of the CDS processing to the second frame in the first embodiment of the present technology.

The pixel AD conversion unit 254 generates the D-phase level of the second frame. The plurality of D-phase levels in the corresponding column of the second frame is sequentially input into the selector 431. The selector 431 selectively outputs the D-phase levels to the buffer 421.

Furthermore, the buffer 432 sequentially reads the plurality of P-phase levels in the corresponding column from the CDS frame memory 440, for output to the selector 433. The selector 433 selectively outputs the P-phase levels to the subtractor 434.

The subtractor 434 subtracts the P-phase level from the D-phase level, and outputs a result of the subtraction as the difference data to the switch 435. Furthermore, the switch 424 is controlled in the open state, and the switch 435 is controlled in the closed state.

Due to the control, the M pieces of arithmetic circuits 410 perform the CDS processing to the second frame, and retain the CDS frame in which the difference data is arranged, in the CDS frame memory 440. Furthermore, the CDS frame is supplied also to the image processing circuit 260.

Figure 16:
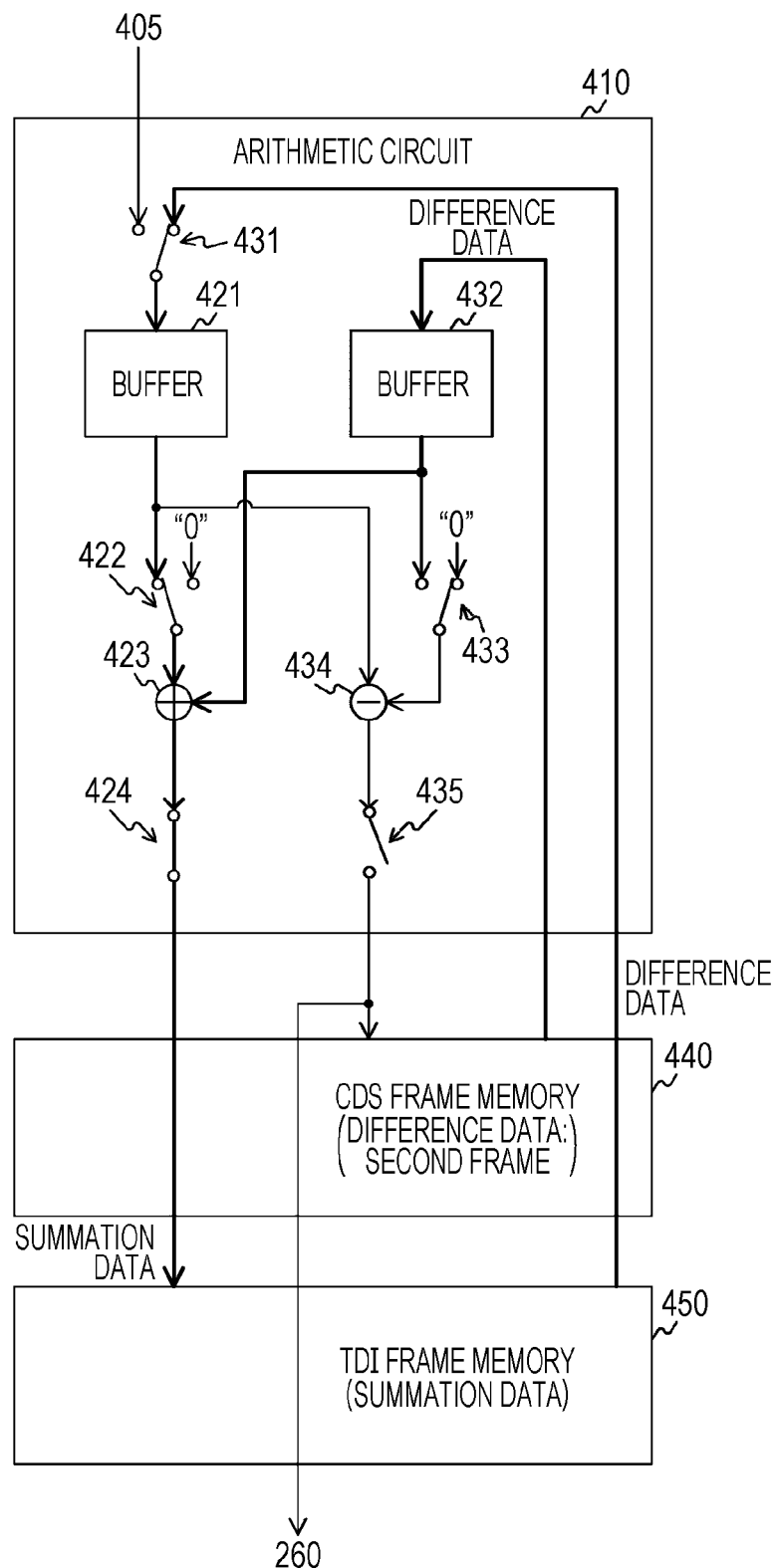
FIG. 16 illustrates an exemplary state of the arithmetic circuit at the time of performance of TDI processing to the second frame in the first embodiment of the present technology.

FIG. 16 illustrates an exemplary state of the arithmetic circuit at the time of performance of the TDI processing to the second frame in the first embodiment of the present technology.

The selector 431 sequentially reads and selects the difference data in the corresponding column from the TDI frame memory 450, for output to the buffer 421. Furthermore, the buffer 432 reads the difference data in the corresponding column from the CDS frame memory 440, for output to the adder 423. With the row address of the difference data read from the TDI frame memory 450 defined as the predetermined address, the row address of the difference data read from the CDS frame memory 440 is at the certain distance from the predetermined address. For example, the row address of the difference data read from the CDS frame memory 440 is adjacent to the predetermined address.

The selector 422 selectively outputs the difference data from the buffer 421 to the adder 423. The adder 423 adds the difference data in the first frame and the difference data in the second frame, for output to the switch 424. Furthermore, the switch 424 is controlled in the closed state, and the switch 435 is controlled in the open state.

Due to the control, the M pieces of arithmetic circuits 410 add the line having the predetermined address of the current second frame and the line having the adjacent address of the past first frame. The processing to the second frame is repeatedly performed to the third and subsequent frames.

Figure 17:
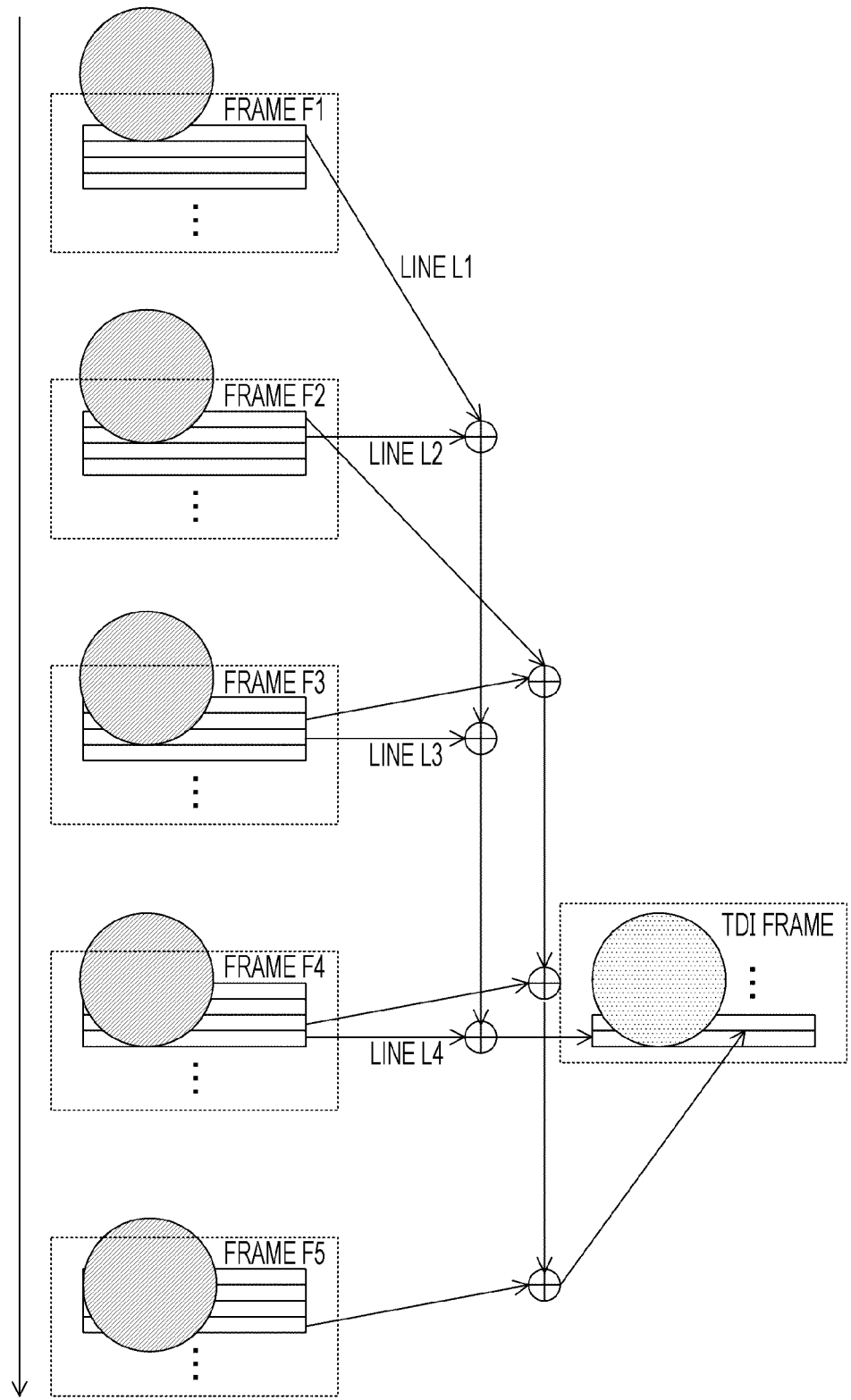
FIG. 17 illustrates exemplary TDI processing in the first embodiment of the present technology.

FIG. 17 illustrates exemplary TDI processing in the first embodiment of the present technology. For example, after initialization of the CDS frame memory 440 and the TDI frame memory 450, frame F1 is captured first. Then, frames F2, F3, F4, and F5 are captured sequentially. An arrow in the figure indicates the direction of movement of a subject. As exemplified in the figure, the subject moves every line in the direction of increase of the row address in the vertical direction.

The signal processing circuit 400 performs the CDS processing to frame F1 first, retains frame F1 after the processing in the CDS frame memory 440, and retains frame F1 in the TDI frame memory 450.

Then, the signal processing circuit 400 performs the CDS processing to frame F2, and adds line L2 in the current frame F2 and line L1 adjacent to line L2 in the past frame F1.

Next, the signal processing circuit 400 performs the CDS processing to frame F3, and adds line L3 in the current frame F3 and line L2 adjacent to line L3 in the past frame F2.

Subsequently, the signal processing circuit 400 performs the CDS processing to frame F4, and adds line L4 in the current frame F4 and line L3 adjacent to line L4 in the past frame F3.

Due to the computation, line L1 in frame F1, line L2 in frame F2, line L3 in frame F3, and line L4 in frame F4 are summed. As described above, because the subject moves every line, each line to be summed is identical in pattern. The signal processing circuit 400 outputs the summed lines as the last line of the TDI frame. As above, the processing of integrating the amount of exposure with shifting in time is called the TDI processing.

The second line from the last in the TDI frame is generated by summation of line L1 in frame F2, line L2 in frame F3, line L3 in frame F4, and line L4 in frame F5. Similarly, the remaining lines each are generated by summation of four lines from frame F3 and the subsequent frames.

In a case where the speed of movement of the subject is fast, the exposure time needs shortening in order to prevent blurring. Shortening of the exposure time is likely to cause an image to be dark. However, performance of the TDI processing enables improvement in brightness with summation of a plurality of lines in the same pattern. Furthermore, as the number of lines to be summed increases, noise reduces due to the effect of smoothing. The improvement in brightness and the noise reduction enable improvement of the image quality of a frame (namely, image data) in comparison to a case where no TDI processing is performed.

Note that, although the signal processing circuit 400 sums four lines, the number of lines to be summed is not limited to four as long as being two or more. Furthermore, for the first four frames, the signal processing circuit 400 makes an integration of the first four lines from the top, but the configuration is not limited thereto. For example, in a case where the direction of movement of the subject is reversed, for the first four frames, the signal processing circuit 400 needs at least to make an integration of the first four lines from the last.

(Exemplary Operation of Solid-State Image Pickup Element)

Figure 18:
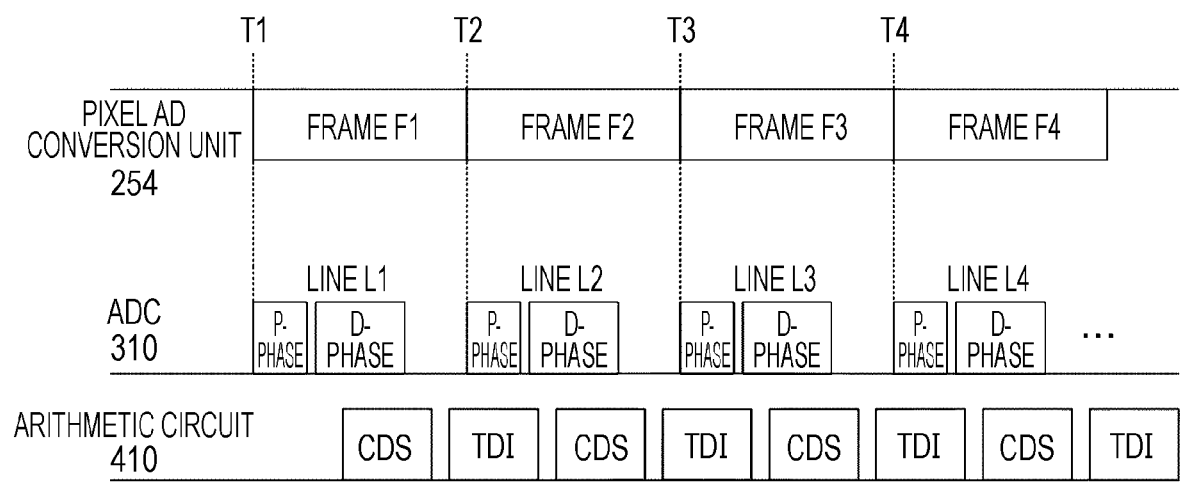
FIG. 18 is a timing chart of an exemplary operation of the solid-state image pickup element in the first embodiment of the present technology.

FIG. 18 is a timing chart of an exemplary operation of the solid-state image pickup element 200 in the first embodiment of the present technology. The pixel AD conversion unit 254 generates frame F1 in the period from timing T1 to timing T2, and generates frame F2 in the period from timing T2 to timing T3. Furthermore, the pixel AD conversion unit 254 generates frame F3 in the period from timing T3 to timing T4, and generates frame F4 from timing T4.

Furthermore, in the period from timing T1 to timing T2, each ADC 310 sequentially generates the P-phase level and the D-phase level of the first frame. Meanwhile, each arithmetic circuit 410 performs the CDS processing at the time of D-phase generation.

Furthermore, in the period from timing T2 to timing T3, each ADC 310 sequentially generates the P-phase level and the D-phase level of the second frame. Meanwhile, each arithmetic circuit 410 performs the TDI processing at the time of P-phase generation and performs the CDS processing at the time of D-phase generation.

For the third and subsequent frames, similarly, the P-phase level and the D-phase level are generated, and the TDI processing and the CDS processing are performed.

Figure 19:
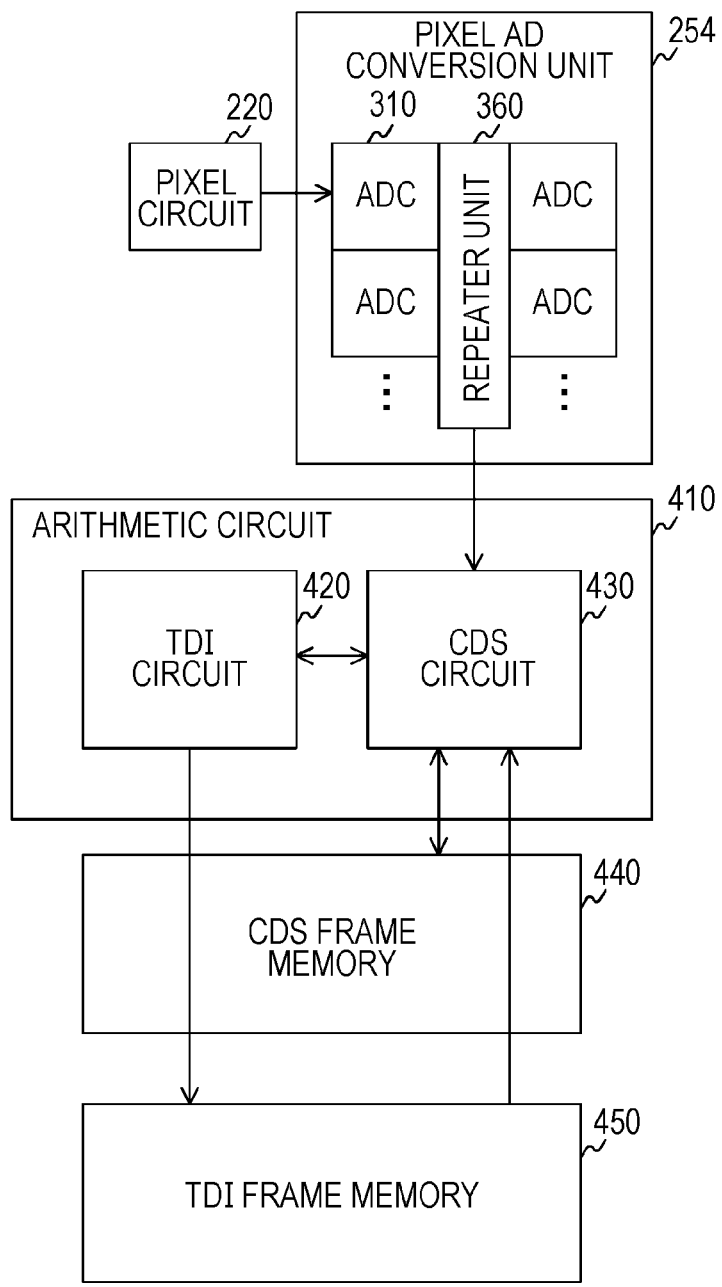
FIG. 19 explanatorily illustrates the computation of the signal processing circuit in the first embodiment of the present technology.

FIG. 19 explanatorily illustrates the computation of the signal processing circuit 400 in the first embodiment of the present technology.

The plurality of pixel circuits 220 each photoelectrically generates an analog pixel signal and supplies the pixel AD conversion unit 254 with the analog pixel signal. The pixel AD conversion unit 254 includes the plurality of ADCs 310 arranged in the two-dimensional grid pattern. The ADCs 310 each convert the analog pixel signal into a digital signal and transfers the digital signal to the arithmetic circuit 410 through the repeater unit 360. The digital signal includes the reset level and the signal level corresponding to the amount of exposure. The ADCs 310 each output the signal level after the reset level. Note that the pixel AD conversion unit 254 is an exemplary analog-to-digital conversion unit in the claims.

The CDS circuit 430 retains the first P-phase frame in which the P-phase levels are arranged, in the CDS frame memory 440. When the D-phase level is input, the CDS circuit 430 reads the P-phase frame from the CDS frame memory 440, and performs the CDS processing of acquiring the difference between the P-phase level and the D-phase level. Then, the CDS circuit 430 updates the CDS frame memory 440 with the first CDS frame after the CDS processing, and retains the CDS frame in the TDI frame memory 450.

Then, the CDS circuit 430 retains the P-phase frame of the second frame in the CDS frame memory 440. When the D-phase level is input, the CDS circuit 430 reads the P-phase frame from the CDS frame memory 440, and performs the second CDS processing of acquiring the difference between the P-phase level and the D-phase level. Then, the CDS circuit 430 updates the CDS frame memory 440 with the CDS frame of the second frame after the CDS processing.

Subsequently, the TDI circuit 420 reads the line having the predetermined address in the (K−1)-th CDS frame from the TDI frame memory 450, and reads the line having the address at the certain distance from the predetermined address in the K-th frame (e.g., adjacent address) from the CDS frame memory 440. Then, the TDI circuit 420 adds the lines, and updates the TDI frame memory 450 with the added lines.

For the third and subsequent frames, processing similar to that of the second frame is repeatedly performed. Note that, for the third and subsequent frames, the number of lines to be summed increases one by one. The number of times of summation increases to a certain number of times (e.g., four times). Due to the processing, the TDI frame in which the summation data is arranged, is generated.

Here, as a comparative example, considered is a solid-state image pickup element including a charge coupled device (CCD) that transfers electric charge with shifting in time and a circuit that accumulates the amount of electric charge thereof in a floating diffusion layer to generate an integral signal. According to the comparative example, as the number of pixels increases at the source from which electric charge is transferred, the capacity of the floating diffusion layer needs increasing at the destination to which electric charge is transferred. The increase of the capacity causes deterioration in pixel sensitivity, and then the image quality of image data deteriorates due to the deterioration in pixel sensitivity. As above, the comparative example has a problem with deterioration in image quality.

In contrast to this, according to the configuration in which the TDI processing is performed after the CDS processing outside the pixel circuit 220, the capacity of the floating diffusion layer in the pixel circuit 220 does not need increasing in accordance with the number of times of addition. Thus, the capacity of the floating diffusion layer can made smaller than that in the comparative example. Therefore, the pixel sensitivity can be made higher than that in the comparative example, resulting in improvement in the image quality of image data.

Next, a method of controlling the circuits in the solid-state image pickup element 200, will be described.

(Exemplary Operation of Solid-State Image Pickup Element)

Figure 20:
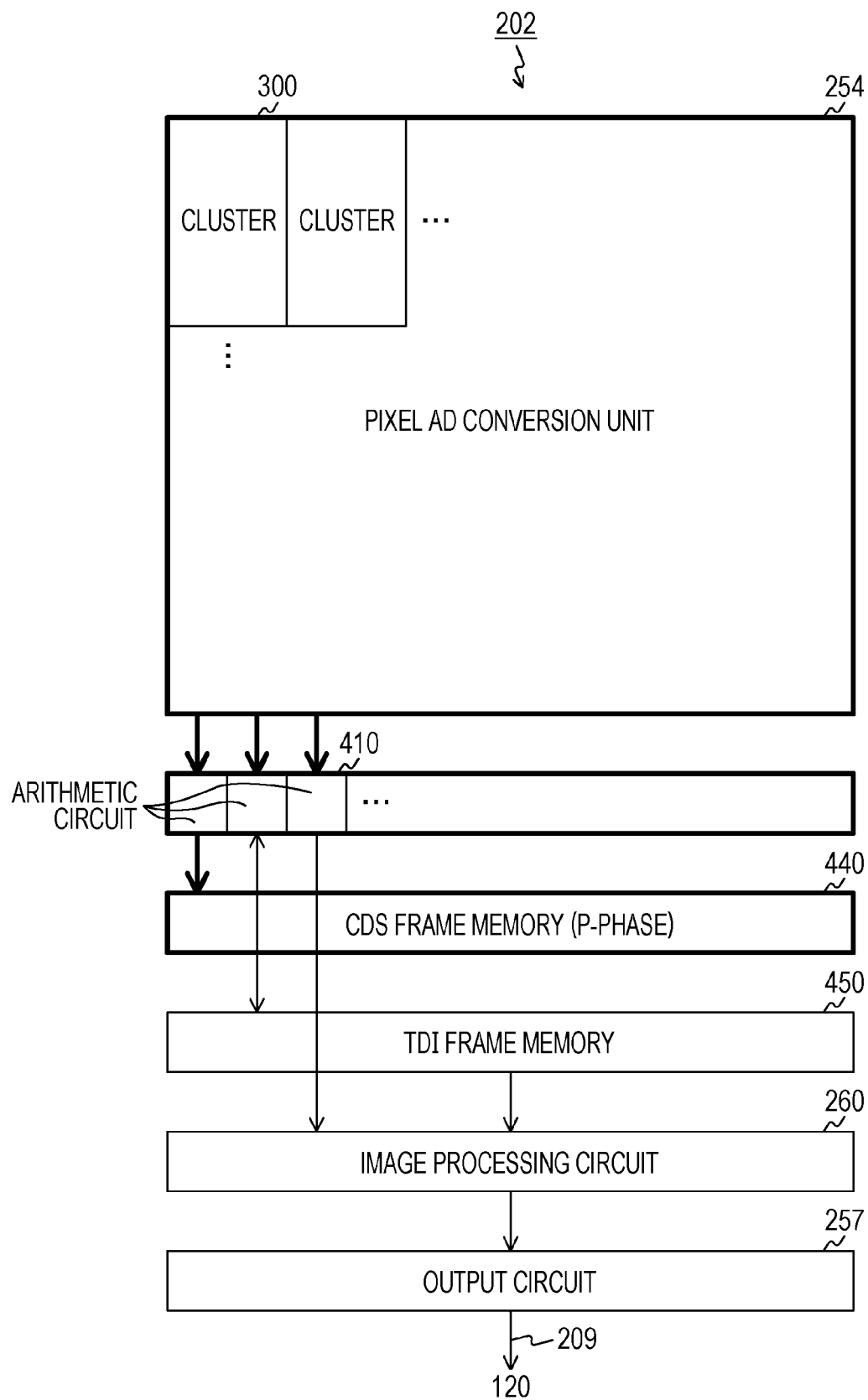
FIG. 20 illustrates an exemplary state of the solid-state image pickup element at the time of retention of the P-phase level in the first embodiment of the present technology.

FIG. 20 illustrates an exemplary state of the solid-state image pickup element 200 at the time of retention of the P-phase level in the first embodiment of the present technology. In the figure, no selector 405 is illustrated for convenience in description.

Every time the pixel AD conversion unit 254 outputs the P-phase levels in each line, the plurality of arithmetic circuits 410 retain the P-phase levels in the CDS frame memory 440. Therefore, the P-phase frame in which the plurality of P-phase levels is arranged, is retained in the CDS frame memory 440.

Figure 21:
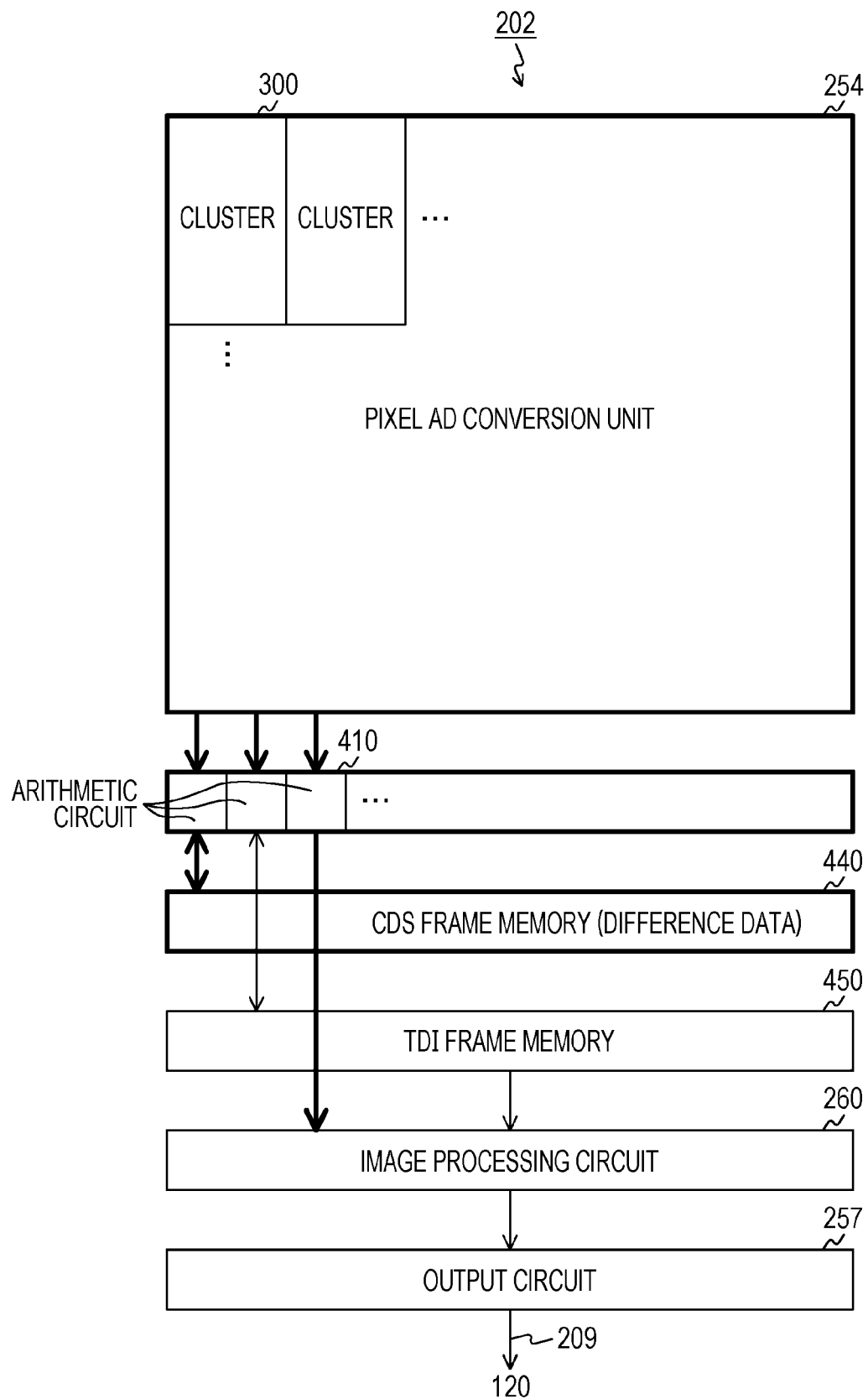
FIG. 21 illustrates an exemplary state of the solid-state image pickup element at the time of performance of the CDS processing in the first embodiment of the present technology.

FIG. 21 illustrates an exemplary state of the solid-state image pickup element 200 at the time of performance of the CDS processing in the first embodiment of the present technology. In the figure, no selector 405 is illustrated.

Every time the pixel AD conversion unit 254 outputs the D-phase levels in each line, the plurality of arithmetic circuits 410 acquires the difference between the D-phase levels and the corresponding P-phase levels in the CDS frame memory 440. Then, the arithmetic circuits 410 update the CDS frame memory 440 with the CDS frame in which the difference data is arranged.

Figure 22:
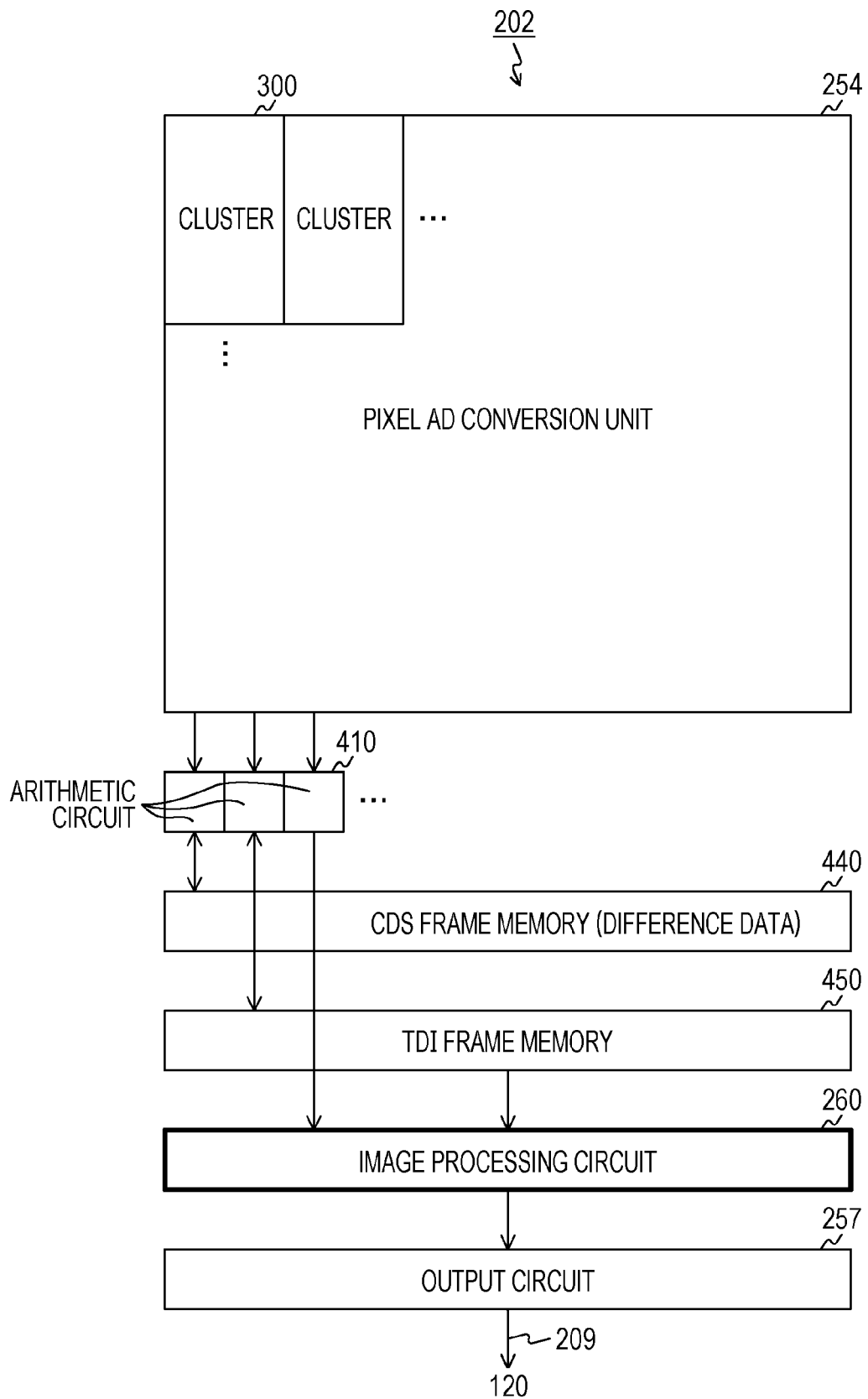
FIG. 22 illustrates an exemplary state of the solid-state image pickup element at the time of performance of image processing after the CDS processing in the first embodiment of the present technology.

FIG. 22 illustrates an exemplary state of the solid-state image pickup element 200 at the time of performance of image processing after the CDS processing in the first embodiment of the present technology. In the figure, no selector 405 is illustrated. The image processing circuit 260 performs the predetermined image processing to the frame after the CDS processing.

Figure 23:
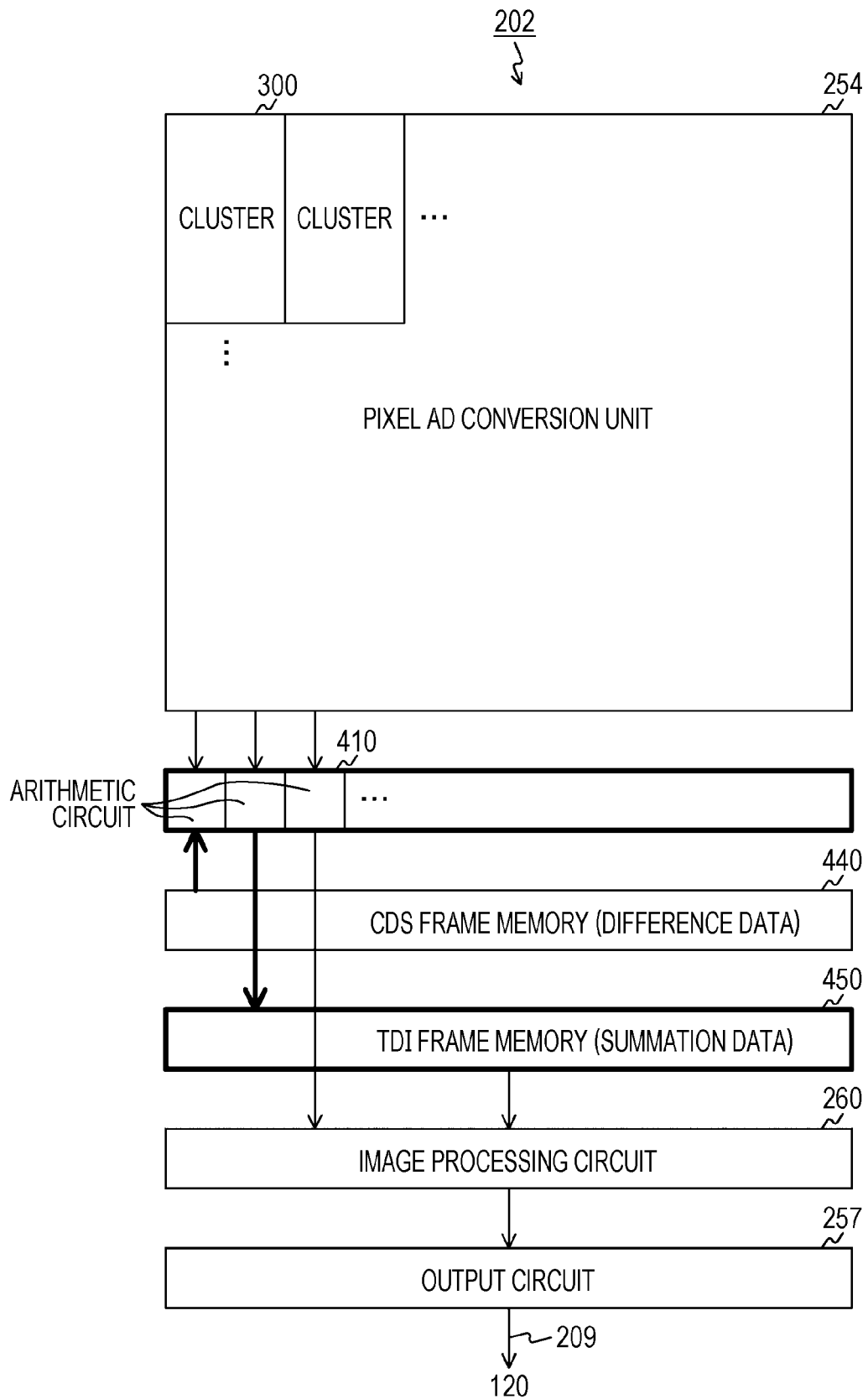
FIG. 23 illustrates an exemplary state of the solid-state image pickup element at the time of performance of the TDI processing in the first embodiment of the present technology.

FIG. 23 illustrates an exemplary state of the solid-state image pickup element at the time of performance of the TDI processing in the first embodiment of the present technology. In the figure, no selector 405 is illustrated.

The plurality of arithmetic circuits 410 adds the line having the predetermined address in the CDS frame memory 440 and the line adjacent to the predetermined address in the TDI frame memory 450. Then, the arithmetic circuits 410 update the TDI frame memory 450 with the summation data indicating the addition in value.

Figure 24:
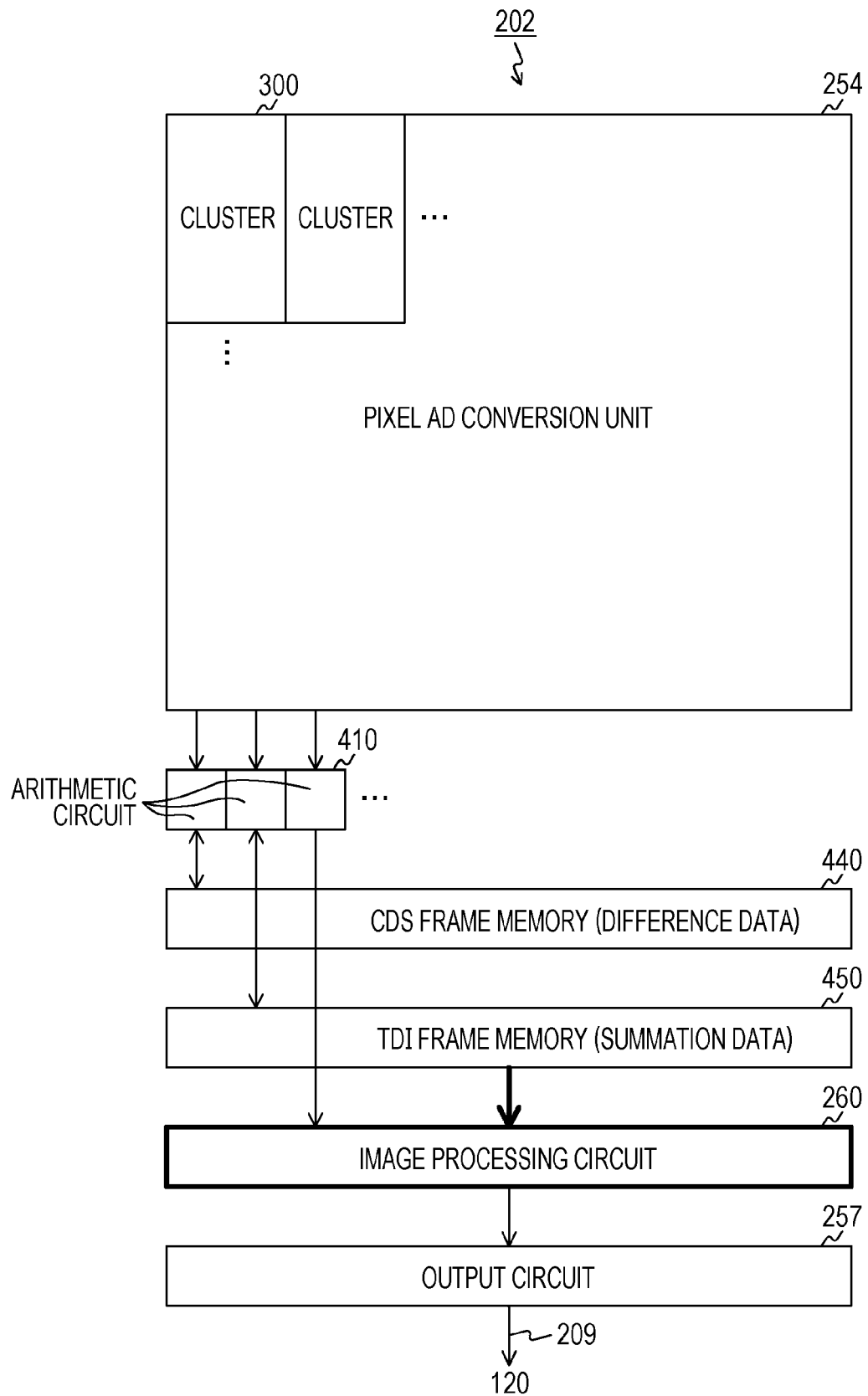
FIG. 24 illustrates an exemplary state of the solid-state image pickup element at the time of performance of image processing after the TDI processing in the first embodiment of the present technology.

FIG. 24 illustrates an exemplary state of the solid-state image pickup element 200 at the time of performance of image processing after the TDI processing in the first embodiment of the present technology. In the figure, no selector 405 is illustrated. The image processing circuit 260 performs image processing, such as black-level correction processing, to the frame after the TDS processing.

Figure 25:
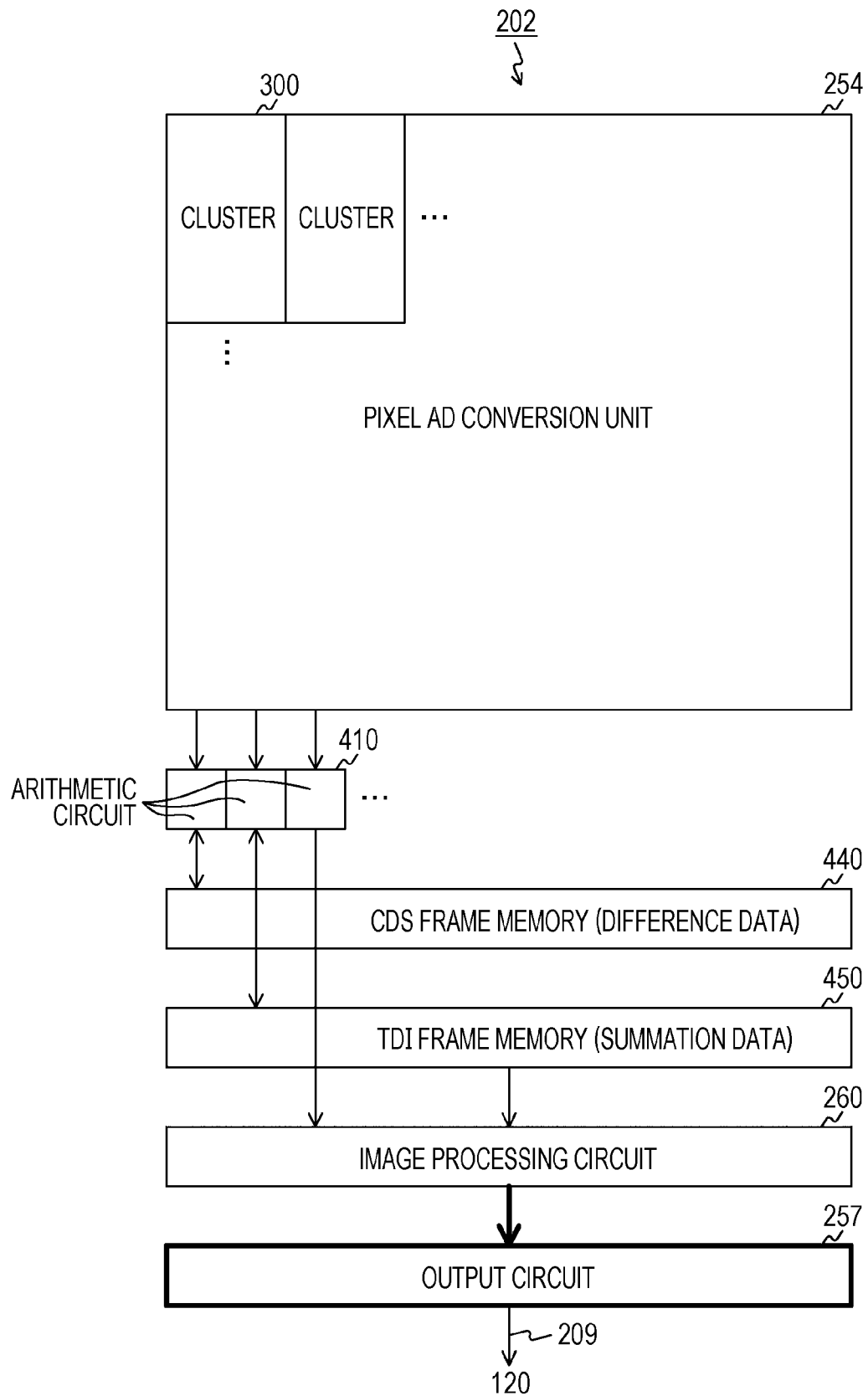
FIG. 25 illustrates an exemplary state of the solid-state image pickup element at the time of output of a frame in the first embodiment of the present technology.

FIG. 25 illustrates an exemplary state of the solid-state image pickup element at the time of output of the frame in the first embodiment of the present technology. In the figure, no selector 405 is illustrated. The output circuit 257 outputs a result of the image processing to, for example, the storage unit 120.

Figure 26:
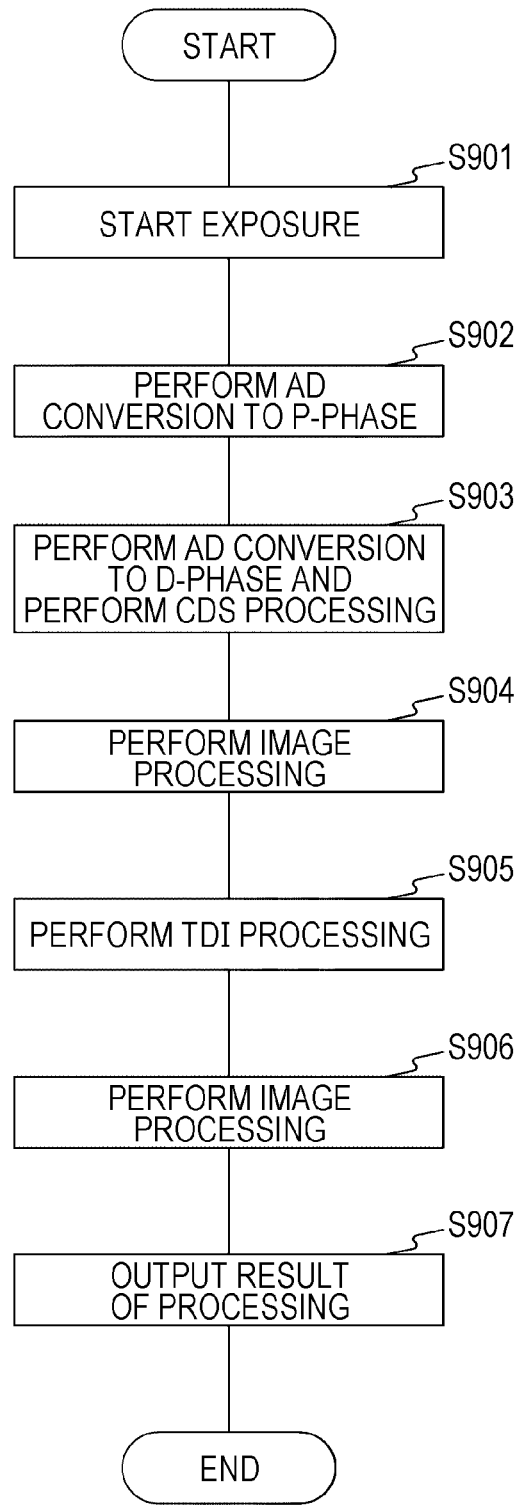
FIG. 26 is a flowchart of an exemplary operation of the solid-state image pickup element in the first embodiment of the present technology.

FIG. 26 is a flowchart of an exemplary operation of the solid-state image pickup element in the first embodiment of the present technology. For example, the operation starts when a predetermined application for frame capturing is executed.

The pixel driving circuit 252 in the solid-state image pickup element 200 drives all the pixels such that simultaneous exposure of all the pixels is started (step S901). The control of simultaneous exposure of all the pixels as above is called a global shutter technique.

Just before completion of the exposure, the ADCs 310 each perform the AD conversion to the P-phase level (step S902). Then, at the time of completion of the exposure, the ADCs 310 each perform the AD conversion to the D-phase level, and the arithmetic circuits 410 each perform the CDS processing (step S903).

The image processing circuit 260 performs the predetermined image processing to the frame after the CDS processing (step S904), and the arithmetic circuits 410 each perform the TDI processing (step S905). The image processing circuit 260 performs the predetermined image processing to the frame after the TDI processing (step S906), and the output circuit 257 outputs a result of the processing (step S907). After step S907, the solid-state image pickup element 200 completes the processing of capturing one frame. At the time of consecutive capturing of two frames or more, the processing at steps S901 to S907 is repeatedly performed in synchronization with the vertical synchronizing signal VSYNC.

As above, in the first embodiment of the present technology, the arithmetic circuits 410 add the predetermined line in the K-th frame after the CDS processing and the adjacent line in the (K−1)-th frame. Thus, the capacity of the floating diffusion layer in each pixel circuit 220 does not need increasing in accordance with the number of times of addition. Therefore, improvement can be made in pixel sensitivity with a small capacity of floating diffusion layer, in comparison to a case where the amount of electric charge of a plurality of pixels is transferred to a floating diffusion layer. The improvement in pixel sensitivity enables improvement in the image quality of image data.

2. Second Embodiment

In the first embodiment, both of the TDI circuit 420 and the CDS circuit 430 are disposed between the pixel AD conversion unit 254 and the CDS frame memory 440. However, either of the circuits (e.g., TDI circuit 420) is not necessarily disposed between the pixel AD conversion unit 254 and the CDS frame memory 440. A solid-state image pickup element 200 in a second embodiment is different from that in the first embodiment in that a TDI circuit 420 is changed in disposition.

Figure 27:
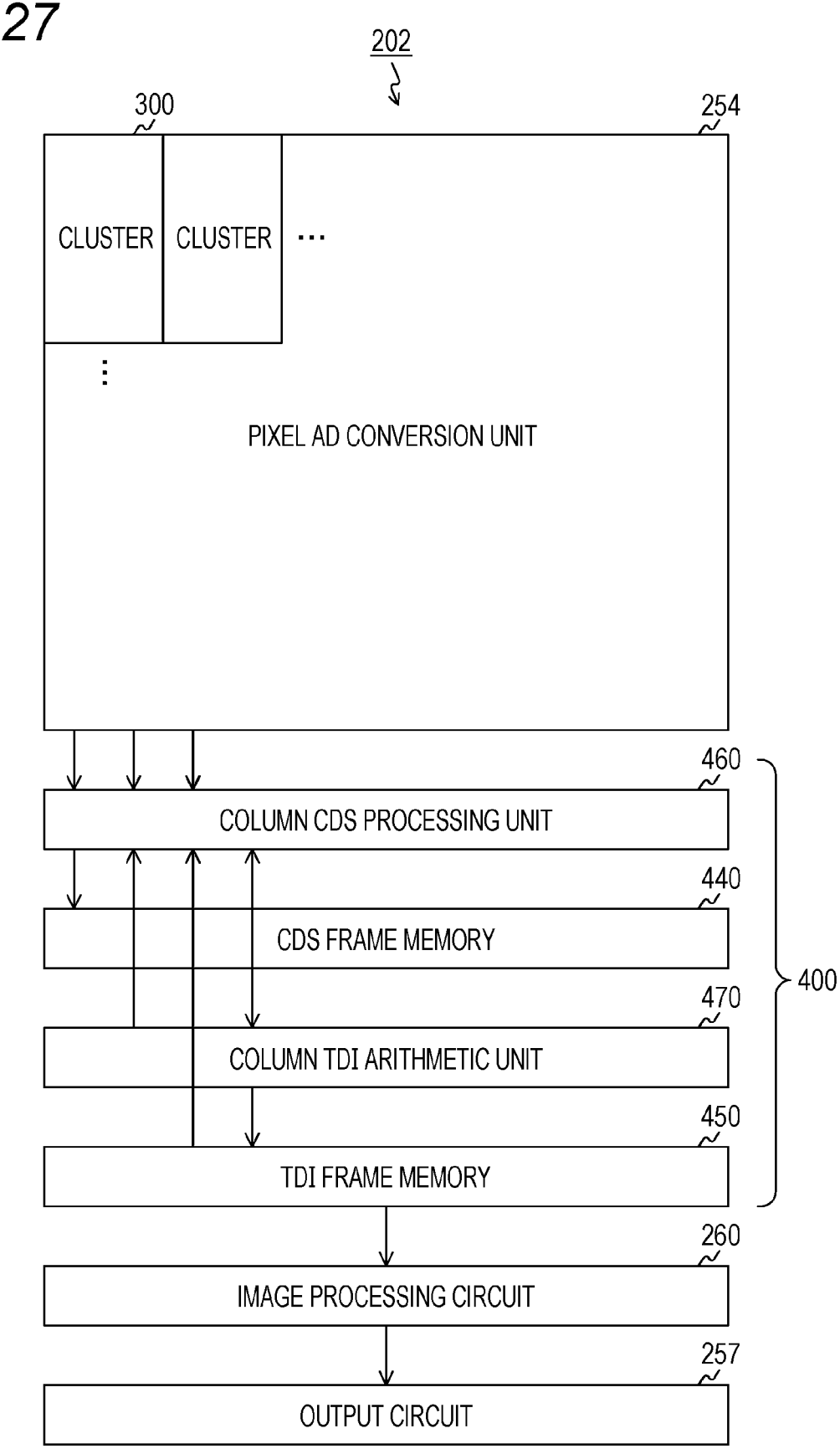
FIG. 27 is a block diagram of an exemplary configuration of a circuit chip in a second embodiment of the present technology.

FIG. 27 is a block diagram of an exemplary configuration of a circuit chip 202 in the second embodiment of the present technology. Instead of a plurality of arithmetic circuits 410, a column CDS processing unit 460 and a column TDI arithmetic unit 470 are disposed on the circuit chip 202 in the second embodiment.

The column CDS processing unit 460 is disposed between a pixel AD conversion unit 254 and a CDS frame memory 440, and the column TDI arithmetic unit 470 is disposed between the CDS frame memory 440 and a TDI frame memory 450. Note that, in the figure, no selector 405 is illustrated for convenience in description.

Figure 28:
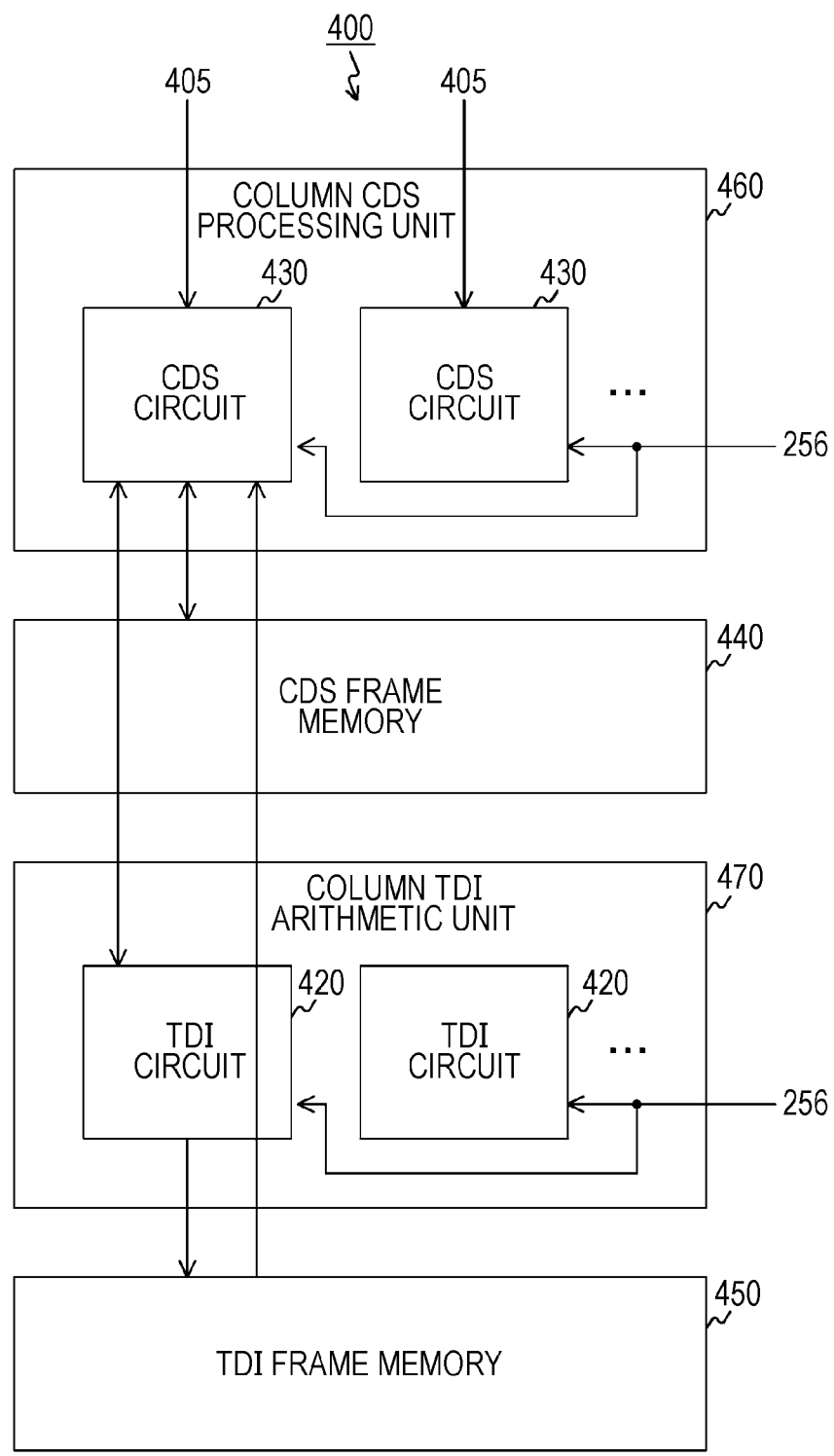
FIG. 28 is a block diagram of exemplary configurations of a column CDS processing unit and a column TDI arithmetic unit in the second embodiment of the present technology.

FIG. 28 is a block diagram of exemplary configurations of the column CDS processing unit 460 and the column TDI arithmetic unit 470 in the second embodiment of the present technology. As exemplified in the figure, a plurality of CDS circuits 430 is arranged in the column CDS processing unit 460. For example, the CDS circuits 430 each are disposed every column of ADCs 310.

Furthermore, a plurality of TDI circuits 420 is arranged in the column TDI arithmetic unit 470. For example, the TDI circuits 420 each are disposed every column of ADCs 310.

As exemplified in the figure, because the CDS circuits 430 and the TDI circuits 420 are disposed differently in position, the degree of freedom of the circuit chip 202 in layout design can be improved.

Figure 29:
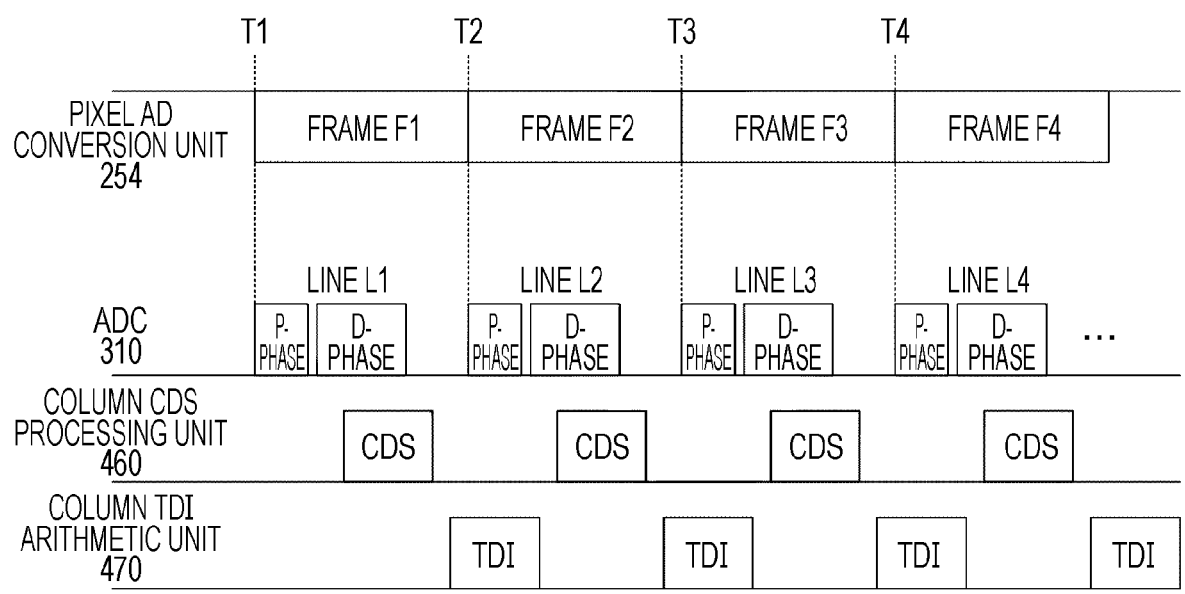
FIG. 29 is a timing chart of an exemplary operation of a solid-state image pickup element in the second embodiment of the present technology.

FIG. 29 is a timing chart of an exemplary operation of the solid-state image pickup element 200 in the second embodiment of the present technology. The pixel AD conversion unit 254 sequentially generates frame F1 in the period from timing T1 to timing T2, frame F2 in the period from timing T2 to timing T3, frame F3 in the period from timing T3 to timing T4, and frame F4 from timing T4.

Furthermore, in the period from timing T1 to timing T2, each ADC 310 sequentially generates the P-phase level and the D-phase level. Meanwhile, the column CDS processing unit 460 performs CDS processing at the time of D-phase generation.

Furthermore, in the period from timing T2 to timing T3, each ADC 310 sequentially generates the P-phase level and the D-phase level of the second frame. Meanwhile, the column TDI arithmetic unit 470 performs TDI processing at the time of P-phase generation. The column CDS processing unit 460 performs the CDS processing at the time of D-phase generation.

For the third and subsequent frames, similarly, the P-phase level and the D-phase level are generated, and the TDI processing and the CDS processing are performed.

As above, in the second embodiment of the present technology, because the TDI circuits 420 and the CDS circuits 430 are disposed differently in position, the degree of freedom in layout design can be improved.

3. Third Embodiment

In the second embodiment, no buffer is inserted between a selector 405 and a selector 431. The timing of output of a digital signal varies between an odd column and an even column. Thus, desirably, a buffer is inserted for timing adjustment. A solid-state image pickup element 200 in a third embodiment is different from that in the second embodiment in that a buffer is added to a CDS circuit 430.

Figure 30:
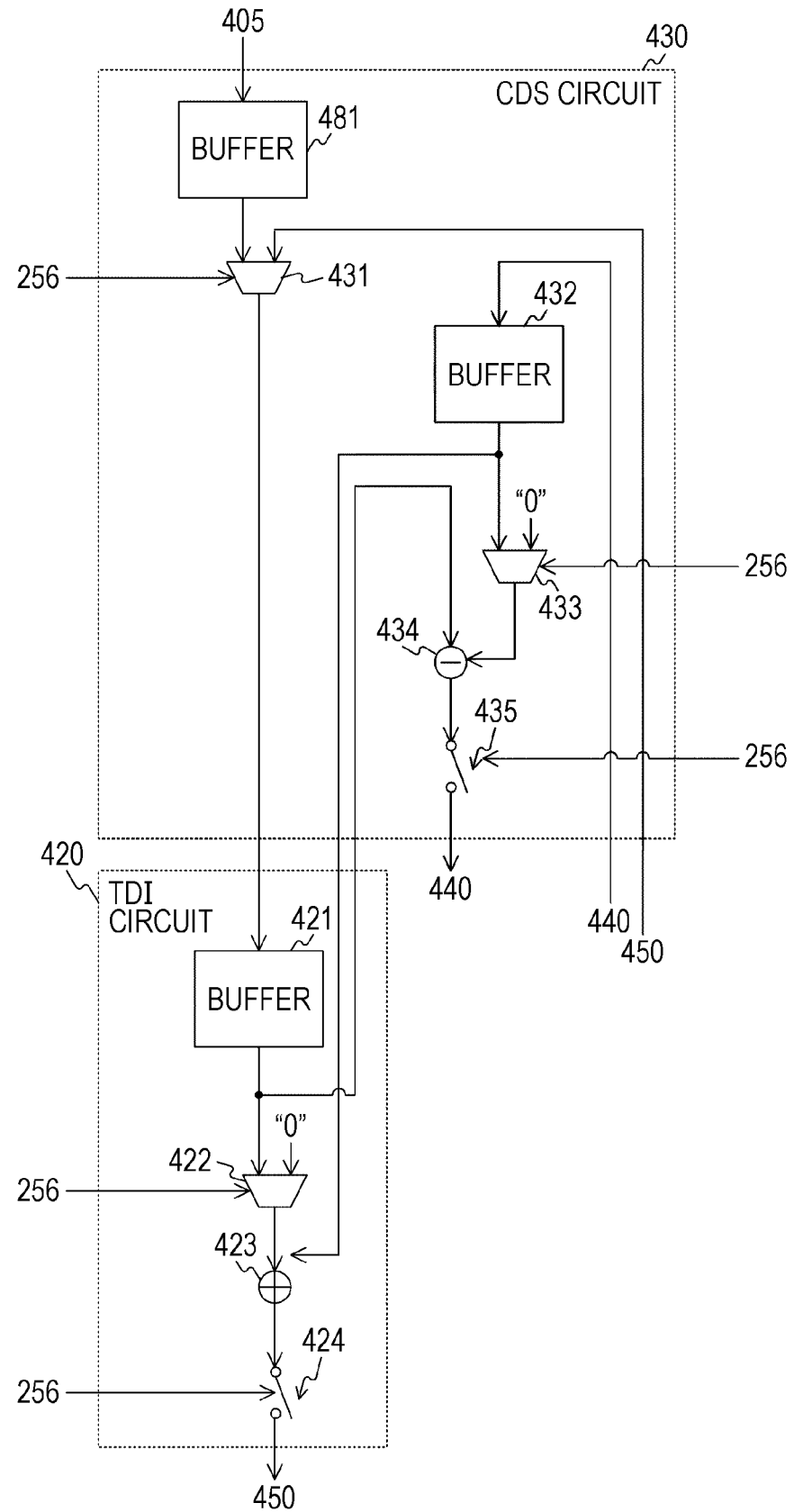
FIG. 30 is a circuit diagram of exemplary configurations of a CDS circuit and a TDI circuit in a third embodiment of the present technology.

FIG. 30 is a circuit diagram of exemplary configurations of a CDS circuit 430 and a TDI circuit 420 in the third embodiment of the present technology. The CDS circuit 430 in the third embodiment is different from that in the second embodiment in that a buffer 481 is further provided.

The buffer 481 is disposed between a selector 405 and a selector 431. Note that the buffer 481 is an exemplary third buffer in the claims.

Figure 31:
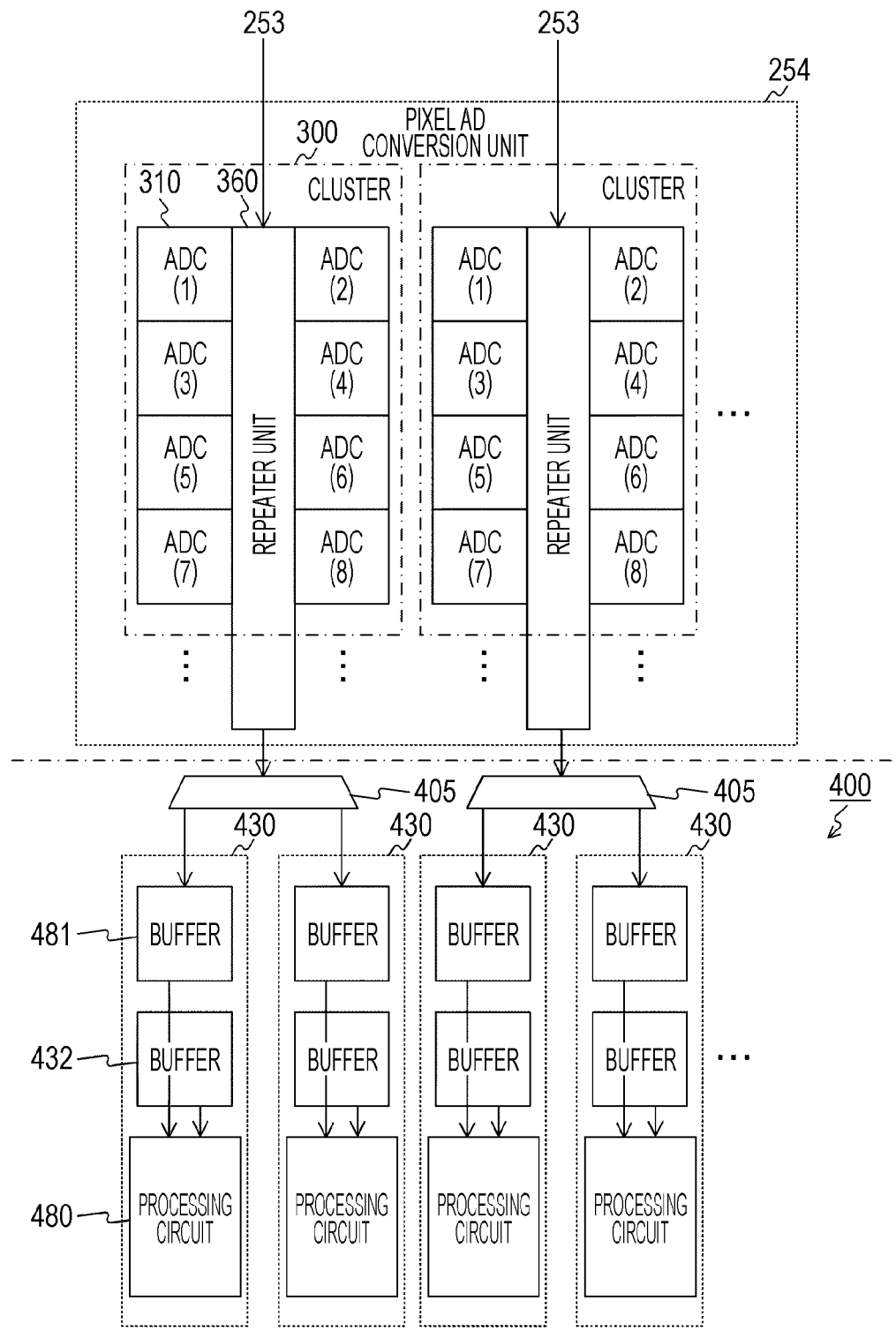
FIG. 31 is a block diagram of an exemplary configuration of a signal processing circuit in the third embodiment of the present technology.

FIG. 31 is a block diagram of an exemplary configuration of a signal processing circuit 400 in the third embodiment of the present technology. As exemplified in the figure, the buffer 481, a buffer 432, and a processing circuit 480 are disposed in each CDS circuit 430. The selectors 431 and 433, a subtractor 434, and a switch 435 in FIG. 30 are disposed in the processing circuit 480.

Each selector 405 outputs digital signals in an even column and digital signals in an odd column at different timings. The buffers 481 added to the post-stage of each selector 405 enable adjustment of the start timing of CDS processing between the odd column and the even column.

As above, in the third embodiment of the present technology, the buffers 481 inserted between each selector 405 and the selectors 431, enable adjustment of the start timing of CDS processing between the odd column and the even column.

4. Fourth Embodiment

In the third embodiment, the processing circuit 480 is disposed every column. As the number of columns increases, the circuit scale of the signal processing circuit 400 increases. A solid-state image pickup element 200 in a fourth embodiment is different from that in the third embodiment in that a processing circuit 480 is shared between adjacent two columns.

Figure 32:
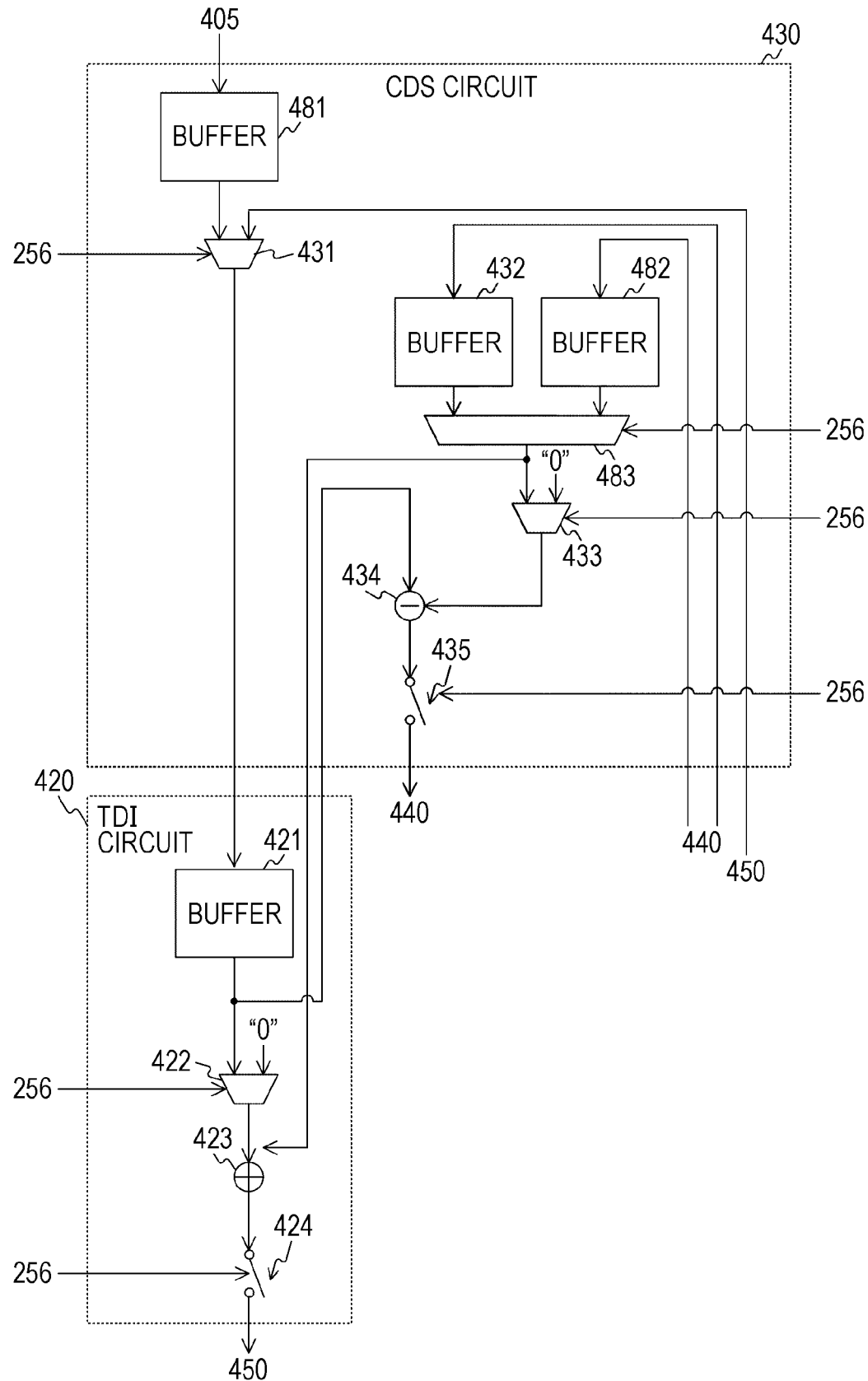
FIG. 32 is a circuit diagram of exemplary configurations of a CDS circuit and a TDI circuit in a fourth embodiment of the present technology.

FIG. 32 is a circuit diagram of exemplary configurations of a CDS circuit 430 and a TDI circuit 420 in the fourth embodiment of the present technology. The CDS circuit 430 in the fourth embodiment is different from that in the third embodiment in that a buffer 482 and a selector 483 are further provided.

The buffer 482 reads a digital signal in an even column from a CDS frame memory 440 and delays the digital signal. Furthermore, a buffer 432 in the fourth embodiment reads a digital signal in an odd column from the CDS frame memory 440 and delays the digital signal.

In accordance with the control of a control circuit 256, the selector 483 selectively outputs either an output of the buffer 482 or an output of the buffer 432, to the TDI circuit 420 and a selector 433.

Figure 33:
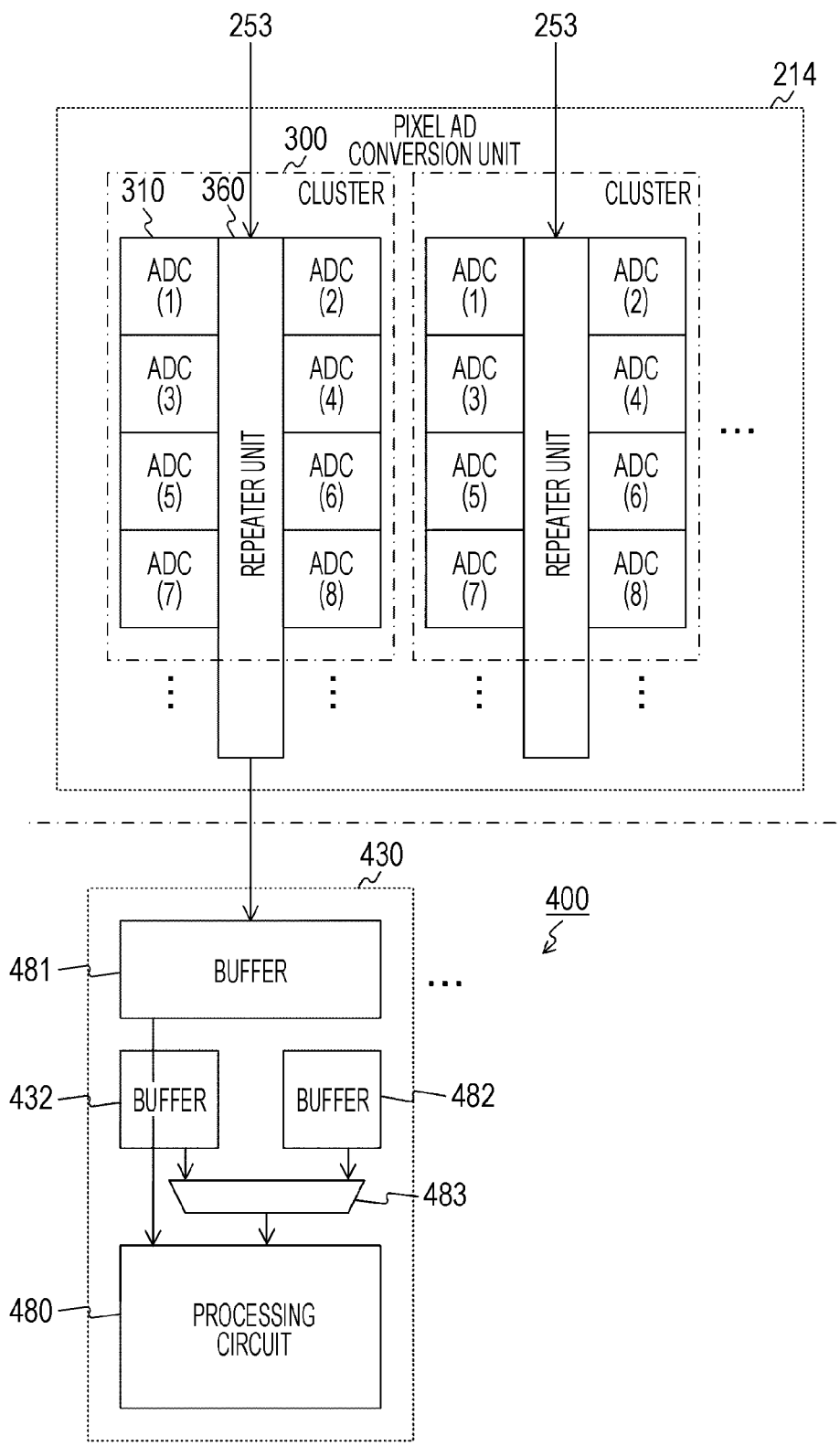
FIG. 33 is a block diagram of an exemplary configuration of a signal processing circuit in the fourth embodiment of the present technology.

FIG. 33 is a block diagram of an exemplary configuration of a signal processing circuit 400 in the fourth embodiment of the present technology. The CDS circuit 430 and the TDI circuit 420 are disposed every adjacent two columns in the signal processing circuit 400 in the fourth embodiment. Note that, in the figure, no selector 405 and no TDI circuit 420 are illustrated.

The buffers 432, 481, and 482, the selector 483, and the processing circuit 480 are disposed in the CDS circuit 430. As exemplified in the figure, in the fourth embodiment, the processing circuit 480 is shared between two columns. Thus, the circuit scale of the signal processing circuit 400 can be reduced in comparison to the third embodiment in which the processing circuit 480 is provided every column.

As above, in the fourth embodiment of the present technology, the processing circuit 480 is shared between adjacent two columns, so that the circuit scale of the signal processing circuit 400 can be reduced in comparison to a case where the processing circuit 480 is disposed every column.

5. Fifth Embodiment

In the third embodiment, the processing circuit 480 is disposed every column. As the number of columns increases, the circuit scale of the signal processing circuit 400 increases. A solid-state image pickup element 200 in a fifth embodiment is different from that in the third embodiment in that a processing circuit 490 is shared between four columns.

Figure 34:
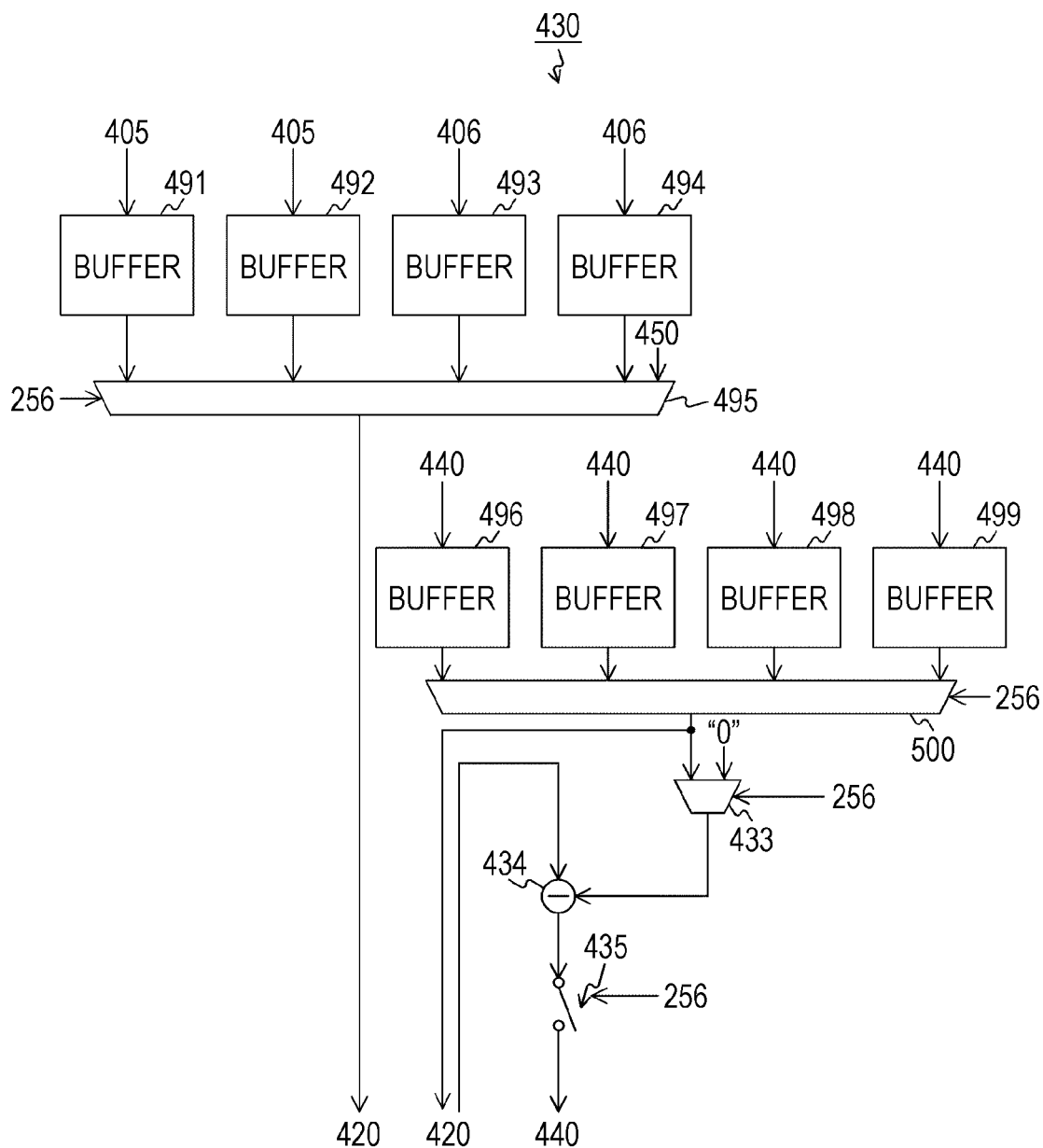
FIG. 34 is a circuit diagram of an exemplary configuration of a CDS circuit in a fifth embodiment of the present technology.

FIG. 34 is a circuit diagram of an exemplary configuration of a CDS circuit 430 in the fifth embodiment of the present technology. The CDS circuit 430 in the fifth embodiment includes buffers 491 to 494, a selector 495, buffers 496 to 499, a selector 500, a selector 433, a subtractor 434, and a switch 435.

The buffers 491 to 494 delay respective digital signals in adjacent four columns from selectors 405 and 406. For example, the selector 405 outputs either a digital signal in the 4m-th column (m is an integer) or a digital signal in the (4m+1)-th column, and the selector 406 outputs either a digital signal in the (4m+2)-th column or a digital signal in the (4m+3)-th column. The buffer 491 delays the digital signal in the 4m-th column, and the buffer 492 delays the digital signal in the (4m+1)-th column. The buffer 493 delays the digital signal in the (4m+2)-th column, and the buffer 494 delays the digital signal in the (4m+3)-th column.

In accordance with a control circuit 256, the selector 495 selectively outputs any one of respective outputs of the buffers 491 to 494 and a TDI frame memory 450, to a TDI circuit 420.

The buffers 496 to 499 delay respective digital signals in adjacent four columns in a CDS frame memory 440. The buffer 496 delays a digital signal in the 4m-th column, and the buffer 497 delays a digital signal in the (4m+1)-th column. The buffer 498 delays a digital signal in the (4m+2)-th column, and the buffer 499 delays a digital signal in the (4m+3)-th column.

In accordance with the control circuit 256, the selector 500 selectively outputs any one of respective outputs of the buffers 496 to 499, to the TDI circuit 420 and the selector 433.

Figure 35:
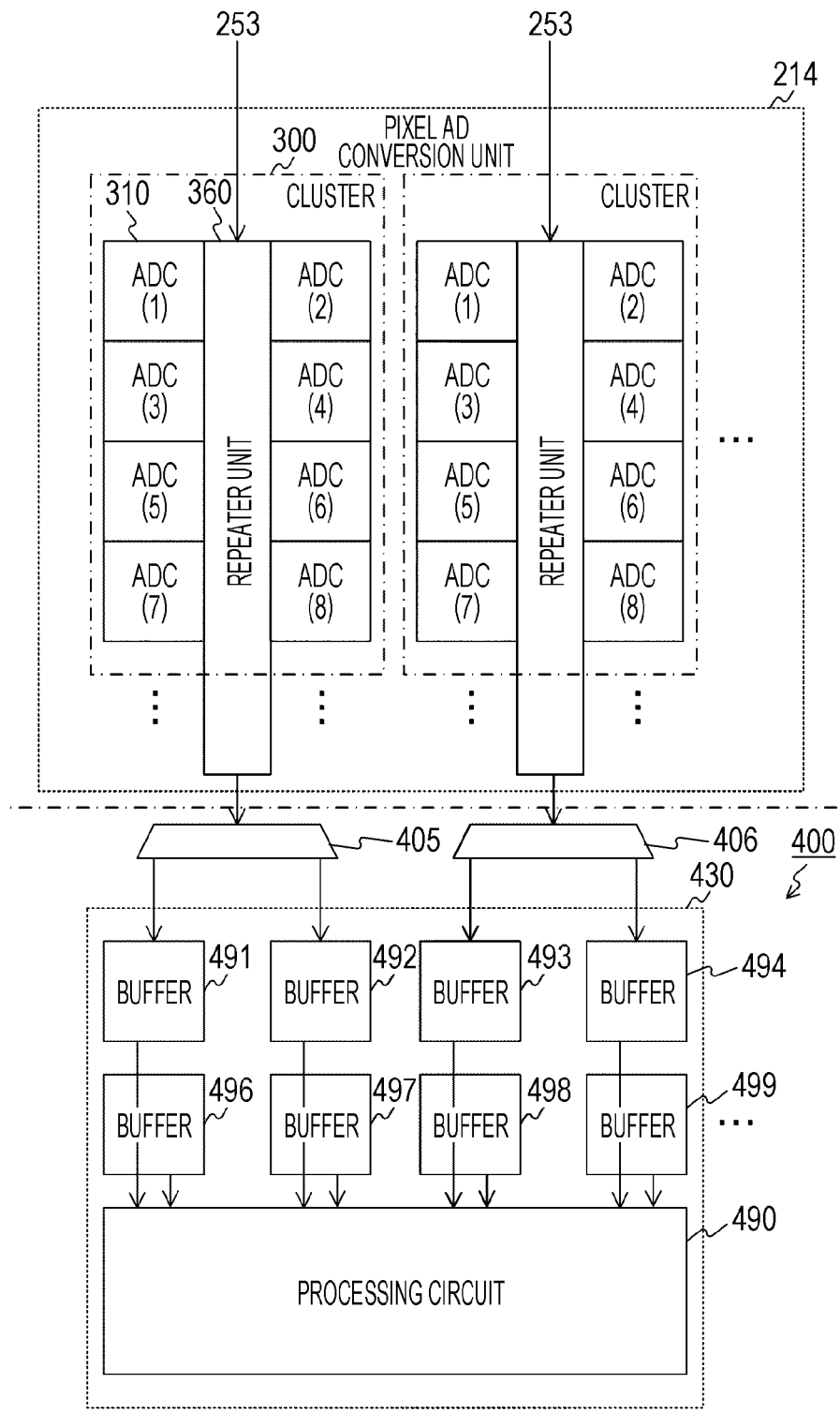
FIG. 35 is a block diagram of an exemplary configuration of a signal processing circuit in the fifth embodiment of the present technology.

FIG. 35 is a block diagram of an exemplary configuration of a signal processing circuit 400 in the fifth embodiment of the present technology. The CDS circuit 430 and the TDI circuit 420 are disposed every four columns in the signal processing circuit 400 in the fifth embodiment. Note that, in the figure, no TDI circuit 420 is illustrated.

The buffers 491 to 494, the buffers 496 to 499, and the processing circuit 490 are disposed in the CDS circuit 430. The selector 495, the selector 500, the selector 433, the subtractor 434, and the switch 435 in FIG. 34 are disposed in the processing circuit 490. As exemplified in the figure, in the fifth embodiment, the processing circuit 490 is shared between four columns. Thus, the circuit scale of the signal processing circuit 400 can be reduced in comparison to the third embodiment in which the processing circuit 480 is provided every column.

As above, in the fifth embodiment of the present technology, the processing circuit 490 is shared between four columns, so that the circuit scale of the signal processing circuit 400 can be reduced in comparison to a case where the processing circuit 480 is disposed every column.

Note that the embodiments are exemplified in order to embody the present technology, and the matters in the embodiments and particular matters concerning the invention in the claims are in mutual correspondence relationship. Similarly, the particular matters concerning the invention in the claims and the matters in the embodiments of the present technology denoted with the same names as the particular matters, are in mutual correspondence relationship. Note that the present technology is not limited to the embodiments, and thus various modifications are made to the embodiments without departing from the scope of the spirit, so that the present technology can be embodied.

Note that the effects in the present specification are just exemplary and are not limitative, and thus other effects may be provided.

Note that the present technology can also have the following configurations.

(1) A solid-state image pickup element including:
   a correlated double sampling circuit that generates a frame in which a predetermined number of lines each including a plurality of digital signals are arranged;
   a time delay integration (TDI) frame memory that retains a (K−1)-th frame generated before a K-th frame, K being an integer; and
   a time delay integration circuit that performs time delay integration processing of adding the line having a predetermined address in the K-th frame and the line having an address at a certain distance from the predetermined address in the (K−1)-th frame.

(2) The solid-state image pickup element according to (1) above, further including:
   a correlated double sampling (CDS) frame memory that retains a frame in which a predetermined reset level is arranged, as a reset frame, in which
   the plurality of digital signals each includes the reset level and a signal level corresponding to an amount of exposure, and
   the correlated double sampling circuit generates the frame with correlated double sampling processing of acquiring a difference between the retained reset level and the signal level.

(3) The solid-state image pickup element according to (2) above, further including:
   an analog-to-digital conversion unit in which a plurality of analog-to-digital converters is arranged in a two-dimensional grid pattern, the plurality of analog-to-digital converters each converting an analog signal into a digital signal.

(4) The solid-state image pickup element according to (3) above, in which
   the correlated double sampling circuit is disposed between the analog-to-digital conversion unit and the CDS frame memory, and
   the time delay integration circuit is disposed between the CDS frame memory and the TDI frame memory.

(5) The solid-state image pickup element according to (4) above, in which
   the correlated double sampling circuit is provided every column in the analog-to-digital conversion unit, and each of the correlated double sampling circuits performs the correlated double sampling processing to the digital signal from the corresponding column.

(6) The solid-state image pickup element according to (4) above, in which
the correlated double sampling circuit is shared between a plurality of columns in the analog-to-digital conversion unit.
(7) The solid-state image pickup element according to any of (4) to (6) above, further including:
a plurality of pixel circuits each generating an analog signal and supplying the analog signal to the analog-to-digital conversion unit, in which
the plurality of pixel circuits is disposed on a predetermined light-receiving chip, and
the TDI frame memory, the correlated double sampling circuit, and the time delay integration circuit are disposed on a predetermined circuit chip layered to the light-receiving chip.
(8) The solid-state image pickup element according to any of (4) to (7) above, in which
the correlated double sampling circuit includes:
a selector that selects either a digital signal generated by the analog-to-digital conversion unit or a digital signal output from the TDI frame memory;
a subtractor that acquires the difference between the reset level and the signal level; and
a first buffer inserted between the TDI frame memory and the subtractor, and
the time delay integration circuit includes:
an adder that adds the line having the predetermined address and the line having the address at the certain distance from the predetermined address; and
a second buffer inserted between the selector and the adder.
(9) The solid-state image pickup element according to (8) above, further including:
a third buffer inserted between the selector and the analog-to-digital conversion unit.
(10) An image pickup apparatus including:
a correlated double sampling circuit that generates a frame in which a predetermined number of lines each including a plurality of digital signals are arranged; a TDI frame memory that retains a (K−1)-th frame generated before a K-th frame;
an arithmetic circuit that adds the line having a predetermined address in the K-th frame and the line having an address at a certain distance from the predetermined address in the (K−1)-th frame, and outputs a result of the addition as integration data; and an image processing circuit that processes the integration data.
(11) A method of controlling a solid-state image pickup element, the method including:
performing correlated double sampling of generating a frame in which a predetermined number of lines each including a plurality of digital signals are arranged;
retaining a (K−1)-th frame generated before a K-th frame, in a TDI frame memory; and
performing time delay integration processing of adding the line having a predetermined address in the K-th frame and the line having an address at a certain distance from the predetermined address in the (K−1)-th frame.
Additionally or alternatively, the present technology can also have the following configurations.
(1') An imaging device comprising:
a first substrate including a plurality of pixels arranged in a matrix, a respective pixel of the plurality of pixels configured to output a pixel signal; and
a second substrate stacked with the first substrate, the second substrate including:
at least a portion of analog to digital circuitry configured to output a digital signal based on the pixel signal,
arithmetic circuitry configured to receive the digital signal,
first memory circuitry coupled to the arithmetic circuitry,
second memory circuitry coupled to the arithmetic circuitry, and
image processing circuitry coupled to the second memory circuitry.
(2') The imaging device according to (1'), wherein the arithmetic circuitry includes column CDS processing circuitry and column TDI arithmetic circuitry.
(3') The imaging device according to (1') or (2'), wherein a frame of digital signal includes a first phase level and a second phase level, and the first memory circuitry is configured to store the first phase level.
(4') The imaging device according to (3'), wherein the arithmetic circuitry is configured to acquire a difference between the second phase level and the first phase level, and to store the difference in the first memory circuitry.
(5') The imaging device according to (4'), wherein the image processing circuitry is configured to perform a predetermined first image processing on the difference.
(6') The imaging device according to (5'), wherein the first image processing is at least one of an image recognition processing, a black-level correction processing, an image correction processing, or a demosaic processing.
(7') The imaging device according to (5') or (6'), wherein the arithmetic circuitry is configured to, after the image processing circuitry performs the predetermined image processing, acquire a sum of a predetermined first line of the frame and a second line of the frame adjacent to the first line of the frame, and store the sum in the second memory circuitry.
(8') The imaging device according to (7'), wherein the image processing circuitry is configured to perform a second image processing on the sum.
(9') The imaging device according to (8'), wherein the second substrate includes output circuitry configured to output a result of the second image processing.
(10') The imaging device according to any one of (1') to (9'), wherein the respective pixel includes a floating diffusion.
(11') A method in an imaging device, the method comprising:
outputting a pixel signal from a respective pixel of a plurality of pixels that are arranged in a matrix; outputting a digital signal from analog to digital circuitry, the digital signal being based on the pixel signal; and
receiving the digital signal by arithmetic circuitry, wherein the imaging device comprises a first substrate including the plurality of pixels, and a second substrate stacked with the first substrate and including at least a portion of the analog to digital circuitry, the arithmetic circuitry, first memory circuitry, second memory circuitry, and image processing circuitry.
(12') The method according to (11'), wherein
a frame of digital signal includes a first phase level and a second phase level, and
the method includes storing the first phase level in the first memory circuitry.
(13') The method according to (12'), further comprising: acquiring, by the arithmetic circuitry, a difference between the second phase level and the first phase level; and storing the difference in the first memory circuitry.

(14') The method according to (13'), further comprising performing, by the image processing circuitry, a predetermined first image processing on the difference.

(15') The method according to (14'), wherein the first image processing is at least one of an image recognition processing, a black-level correction processing, an image correction processing, or a demosaic processing.

(16') The method according to (14') or (15'), further comprising:
acquiring, by the arithmetic circuitry and after the performing the predetermined image processing, a sum of a predetermined first line of the frame and a second line of the frame adjacent to the first line of the frame, and storing, by the arithmetic circuitry, the sum in the second memory circuitry.

(17') The method according to (16'), further comprising performing, by the image processing circuitry, a second image processing on the sum.

(18') The method according to (17'), further comprising outputting, by output circuitry included in the second substrate, a result of the second image processing.

(19') The method according to any one of (11') to (18'), wherein the respective pixel includes a floating diffusion.

(20') An electronic apparatus comprising:
an optical assembly configured to condense and guide incident light; and
an imaging device configured to receive the incident light, the imaging device comprising:
a first substrate including a plurality of pixels arranged in a matrix, a respective pixel of the plurality of pixels configured to output a pixel signal in response to the incident light, and
a second substrate stacked with the first substrate, the second substrate including:
at least a portion of analog to digital circuitry configured to output a digital signal based on the pixel signal,
arithmetic circuitry configured to receive the digital signal,
first memory circuitry coupled to the arithmetic circuitry,
second memory circuitry coupled to the arithmetic circuitry, and
image processing circuitry coupled to the second memory circuitry.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

100 Image pickup apparatus
110 Optical unit
120 Storage unit
130 Control unit
140 Communication unit
200 Solid-state image pickup element
201 Light-receiving chip
202 Circuit chip
210 Pixel array unit
211 Pixel block
212 Peripheral circuit
220 Pixel circuit
221 Reset transistor
222 Floating diffusion layer
223 Transfer transistor
224 Photodiode
225 Discharge transistor
251 DAC
252 Pixel driving circuit
253 Time-code generation unit
254 Pixel AD conversion unit
255 Vertical scanning circuit
256 Control circuit
257 Output circuit
260 Image processing circuit
300 Cluster
310 ADC
320 Differential input circuit
321, 324, 326, 331, 332, 334, 335 pMOS transistor
322, 323, 325, 327, 333, 336, 337 nMOS transistor
330 Positive feedback circuit
340 Latch control circuit
350 Latch circuit
360 Repeater unit
400 Signal processing circuit
405, 406, 422, 431, 433, 483, 495, 500 Selector
410 Arithmetic circuit
420 TDI circuit
421, 432, 481, 482, 491 to 494, 496 to 499 Buffer
423 Adder
424, 435 Switch
430 CDS circuit
434 Subtractor
440 CDS frame memory
450 TDI frame memory
460 Column CDS processing unit
470 Column TDI arithmetic unit
480, 490 Processing circuit

The invention claimed is:

1. An imaging device comprising:
a first substrate including a plurality of pixels arranged in a matrix, a respective pixel of the plurality of pixels configured to output a pixel signal; and
a second substrate stacked with the first substrate, the second substrate including:
at least a portion of analog to digital circuitry configured to output a digital signal based on the pixel signal,
arithmetic circuitry configured to receive the digital signal,
first memory circuitry coupled to the arithmetic circuitry,
second memory circuitry coupled to the arithmetic circuitry, and
image processing circuitry coupled to the second memory circuitry;
wherein the arithmetic circuitry includes column correlated double sampling (CDS) processing circuitry and column time delay integration (TDI) arithmetic circuitry.

2. The imaging device according to claim 1, wherein a frame of digital signal includes a first phase level and a second phase level, and the first memory circuitry is configured to store the first phase level.

3. The imaging device according to claim 2, wherein the arithmetic circuitry is configured to acquire a difference between the second phase level and the first phase level, and to store the difference in the first memory circuitry.

4. The imaging device according to claim 3, wherein the image processing circuitry is configured to perform a first image processing on the difference.

5. The imaging device according to claim 4, wherein the first image processing is at least one of an image recognition processing, a black-level correction processing, an image correction processing, or a demosaic processing.

6. An imaging device, comprising:
a first substrate including a plurality of pixels arranged in a matrix, a respective pixel of the plurality of pixels configured to output a pixel signal; and
a second substrate stacked with the first substrate, the second substrate including:
at least a portion of analog to digital circuitry configured to output a digital signal based on the pixel signal,
arithmetic circuitry configured to receive the digital signal,
first memory circuitry coupled to the arithmetic circuitry,
second memory circuitry coupled to the arithmetic circuitry, and
image processing circuitry coupled to the second memory circuitry; wherein
a frame of digital signal includes a first phase level and a second phase level, and the first memory circuitry is configured to store the first phase level,
the arithmetic circuitry is configured to acquire a difference between the second phase level and the first phase level, and to store the difference in the first memory circuitry,
the image processing circuitry is configured to perform a first image processing on the difference, and
the arithmetic circuitry is configured to, after the image processing circuitry performs the first image processing, acquire a sum of a predetermined first line of the frame and a second line of the frame adjacent to the first line of the frame, and store the sum in the second memory circuitry.

7. The imaging device according to claim 6, wherein the image processing circuitry is configured to perform a second image processing on the sum.

8. The imaging device according to claim 7, wherein the second substrate includes output circuitry configured to output a result of the second image processing.

9. The imaging device according to claim 1, wherein the respective pixel includes a floating diffusion.

10. A method for use in an imaging device, the method comprising:
outputting a pixel signal from a respective pixel of a plurality of pixels that are arranged in a matrix;
outputting a digital signal from analog to digital circuitry, the digital signal being based on the pixel signal;
receiving the digital signal by arithmetic circuitry, wherein the imaging device comprises a first substrate including the plurality of pixels, and a second substrate stacked with the first substrate and including at least a portion of the analog to digital circuitry, the arithmetic circuitry, first memory circuitry, second memory circuitry, and image processing circuitry, and a frame of digital signal includes a first phase level and a second phase level;
storing the first phase level in the first memory circuitry;
acquiring, by the arithmetic circuitry, a difference between the second phase level and the first phase level;
storing the difference in the first memory circuitry;
performing, by the image processing circuitry, a first image processing on the difference;
acquiring, by the arithmetic circuitry and after the performing the first image processing, a sum of a predetermined first line of the frame and a second line of the frame adjacent to the first line of the frame; and
storing, by the arithmetic circuitry, the sum in the second memory circuitry.

11. The method according to claim 10, wherein the first image processing is at least one of an image recognition processing, a black-level correction processing, an image correction processing, or a demosaic processing.

12. The method according to claim 10, further comprising performing, by the image processing circuitry, a second image processing on the sum.

13. The method according to claim 12, further comprising outputting, by output circuitry included in the second substrate, a result of the second image processing.

14. The method according to claim 10, wherein the respective pixel includes a floating diffusion.

15. An electronic apparatus comprising:
an optical assembly configured to condense and guide incident light; and
an imaging device according to claim 1.

16. An electronic apparatus comprising:
an optical assembly configured to condense and guide incident light; and
an imaging device according to claim 6.

* * * * *